United States Patent
Gunn et al.

(10) Patent No.: US 9,152,211 B2
(45) Date of Patent: Oct. 6, 2015

(54) ELECTRONIC DEVICE WITH ENHANCED NOTIFICATIONS

(71) Applicant: Motorola Mobility LLC, Libertyville, IL (US)

(72) Inventors: Michael E Gunn, Barrington, IL (US); Nathan M Connell, Ann Arbor, MI (US); Christian L Flowers, Chicago, IL (US); Andrew K Wells, Lindenhurst, IL (US); Long Ling, Northbrook, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 107 days.

(21) Appl. No.: 13/830,452

(22) Filed: Mar. 14, 2013

(65) Prior Publication Data

US 2014/0120988 A1    May 1, 2014

Related U.S. Application Data

(60) Provisional application No. 61/720,322, filed on Oct. 30, 2012, provisional application No. 61/736,536, filed on Dec. 12, 2012, provisional application No. 61/757,690, filed on Jan. 28, 2013.

(51) Int. Cl.
*H04M 1/725* (2006.01)
*G06F 1/32* (2006.01)
(Continued)

(52) U.S. Cl.
CPC ............... *G06F 1/3234* (2013.01); *G06F 3/01* (2013.01); *G06F 3/0488* (2013.01); *H04M 1/72519* (2013.01)

(58) Field of Classification Search
CPC ............. G09G 2340/0407; G09G 2340/0414; G09G 2340/0421; G06T 3/40; G06F 3/0481
USPC .................... 345/660, 666; 370/311; 455/574
See application file for complete search history.

(56) References Cited

U.S. PATENT DOCUMENTS 5,570,369 A * 10/1996 Jokinen ......................... 370/311
6,137,466 A    10/2000 Moughanni et al.
(Continued)

FOREIGN PATENT DOCUMENTS

EP    2189890 A2    5/2010
EP    2620858 A2    7/2013
(Continued)

OTHER PUBLICATIONS

Patent Cooperation Treaty, "PCT Search Report and Written Opinion of the International Searching Authority" for International Application No. PCT/US2013/062583 dated Jan. 3, 2014, 9 pages.
(Continued)

*Primary Examiner* — Todd Buttram
(74) *Attorney, Agent, or Firm* — Shumaker & Sieffert, P.A.

(57) ABSTRACT

There is disclosed an electronic device comprising a receiver, a display, an application processor and a sensor hub. The receiver is configured to receive notifications from a remote device. The display is configured to provide information including notifications. The application processor and the sensor hub are in communication with the display. The application processor is configured to provide instructions for displaying full screen information at the display during a non-sleep mode of the electronic device. The full screen information includes a first notification associated with information received by the electronic device during the non-sleep mode. The sensor hub is configured to provide instructions for displaying partial screen information at the display during a sleep mode of the electronic device. The partial screen information includes a second notification associated with information received by the electronic device during the sleep mode.

19 Claims, 13 Drawing Sheets

(51) Int. Cl.
*G06F 3/01* (2006.01)
*G06F 3/0488* (2013.01)

(56) References Cited

U.S. PATENT DOCUMENTS

| | | | |
|---|---|---|---|
| 7,194,248 B2* | 3/2007 | Kim | 455/343.1 |
| 7,474,288 B2 | 1/2009 | Smith et al. | |
| 7,894,836 B1* | 2/2011 | Fuoss et al. | 455/466 |
| 7,913,182 B2* | 3/2011 | Bear et al. | 715/778 |
| 7,995,050 B2 | 8/2011 | Wong et al. | |
| 8,294,659 B2* | 10/2012 | Rosenblatt | 345/102 |
| 8,514,757 B2* | 8/2013 | Lee et al. | 370/311 |
| 8,539,382 B2 | 9/2013 | Lyon et al. | |
| 2007/0268200 A1 | 11/2007 | Fuller et al. | |
| 2008/0158117 A1 | 7/2008 | Wong et al. | |
| 2009/0006991 A1 | 1/2009 | Lindberg et al. | |
| 2009/0100141 A1* | 4/2009 | Kirkland et al. | 709/206 |
| 2010/0171753 A1 | 7/2010 | Kwon | |
| 2010/0257490 A1* | 10/2010 | Lyon et al. | 715/863 |
| 2010/0269040 A1 | 10/2010 | Lee | |
| 2010/0309105 A1* | 12/2010 | Baldischweiler | 345/87 |
| 2010/0328431 A1* | 12/2010 | Kim et al. | 348/46 |
| 2012/0005509 A1 | 1/2012 | Araki et al. | |
| 2012/0064937 A1* | 3/2012 | Petitgrand et al. | 455/522 |
| 2012/0169608 A1 | 7/2012 | Forutanpour et al. | |
| 2012/0208501 A1 | 8/2012 | Tsuda | |
| 2012/0229399 A1* | 9/2012 | Kobayashi et al. | 345/173 |
| 2012/0254878 A1 | 10/2012 | Nachman et al. | |
| 2013/0080171 A1 | 3/2013 | Mozer et al. | |
| 2013/0124207 A1 | 5/2013 | Sarin et al. | |
| 2013/0191791 A1* | 7/2013 | Rydenhag et al. | 715/863 |
| 2013/0215061 A1* | 8/2013 | Rydenhag et al. | 345/173 |
| 2013/0222208 A1* | 8/2013 | Gorilovsky et al. | 345/1.1 |
| 2013/0307809 A1 | 11/2013 | Sudou | |
| 2014/0063049 A1* | 3/2014 | Armstrong-Muntner | 345/619 |
| 2014/0118272 A1 | 5/2014 | Gunn | |
| 2014/0120988 A1 | 5/2014 | Gunn et al. | |
| 2014/0122911 A1 | 5/2014 | Gunn et al. | |
| 2014/0335827 A1* | 11/2014 | Tsuda | 455/411 |

FOREIGN PATENT DOCUMENTS

| | | |
|---|---|---|
| WO | 2012044201 A2 | 4/2012 |
| WO | 2012108213 A1 | 8/2012 |
| WO | 2013061156 A2 | 5/2013 |
| WO | 2013126078 A1 | 8/2013 |

OTHER PUBLICATIONS

Patent Cooperation Treaty, "PCT Search Report and Written Opinion of the International Searching Authority" for International Application No. PCT/US2013/063362 dated Jan. 7, 2014, 12 pages.

LG Mytouch—Do Not Get Power Button Is Faulty, http://support.t-mobile.com/thread/37912, Jan. 16, 2013.

Eaton, "Your Smartphone is Listening to You Sleep: The Next Terrifying, Awesome Frontier in Voice Tech". Retrieved from the Internet: <http://www.fastcompany.com/3001572/your-smartphone-listening-you-sleep-next-terrifying-awesome-frontier-voice-tech> Sep. 25, 2012. 5 pgs.

Ion, "An always-on Siri: MindMeld listens to you talk, finds what you need". Retrieved from the Internet: <http://arstechnica.com/gadgets/2012/10/an-always-on-siri-mindmeld-listens-to-you-talk-finds-what-you-need/> Oct. 5, 2012. 3 pgs.

Notice of Allowance from U.S. Appl. No. 13/836,987, mailed Oct. 8, 2014 8 pp.

Jesus Diaz, Future iPhones May Have Always-On Display, http://gizmodo.com/5094416/future-iphones-may-have always+on-display, Nov. 20, 2008, all pages.

Sensor Platforms, Inc., "Sensing Subsystem: Sensor Hubs, Smart Sensors and Application Processors", Oct. 15, 2012, 2 pages.

Daniel Torres, "Using Sensor Controllers to Reduce Power consumption in Mobile Computing", Sep. 12, 2012, 7 pages.

"Sensor Platforms' FreeMotion Library Works With All Mobile Microporocessors" Sensorplatforms.com, San Jose, California; posted Jul. 18, 2012, 2 pages.

Notice of Allowance from U.S. Appl. No. 13/836,987, mailed Jan. 5, 2015 7 pp.

Non-Final Office Action from U.S. Appl. No. 13/836,987 mailed Apr. 21, 2015 7 pp.

International Preliminary Report on Patentability From International Application No. PCT/US2013/062583, mailed May 14, 2015, 17 pp.

Response to Office Action from U.S. Appl. No. 13/836,987, filed Jul. 7, 2015 10 pp.

Notice of Allowance from U.S. Appl. No. 13/836,987, mailed Jul. 31, 2015 7 pp.

\* cited by examiner

| FIG. 3A |
| FIG. 3B |

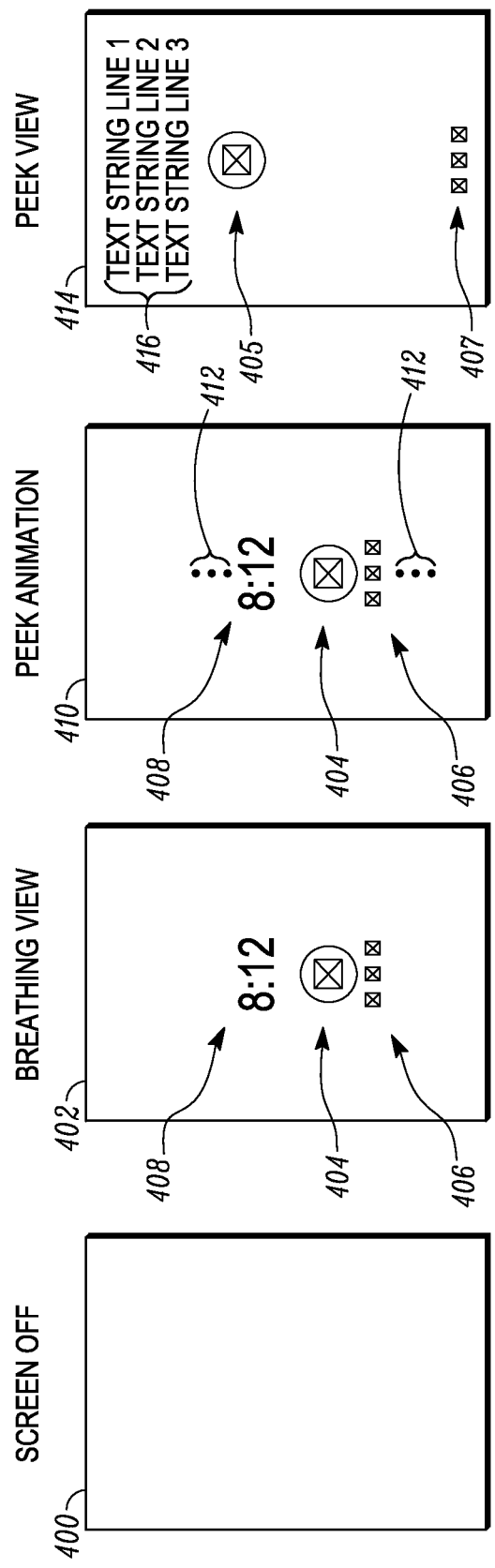

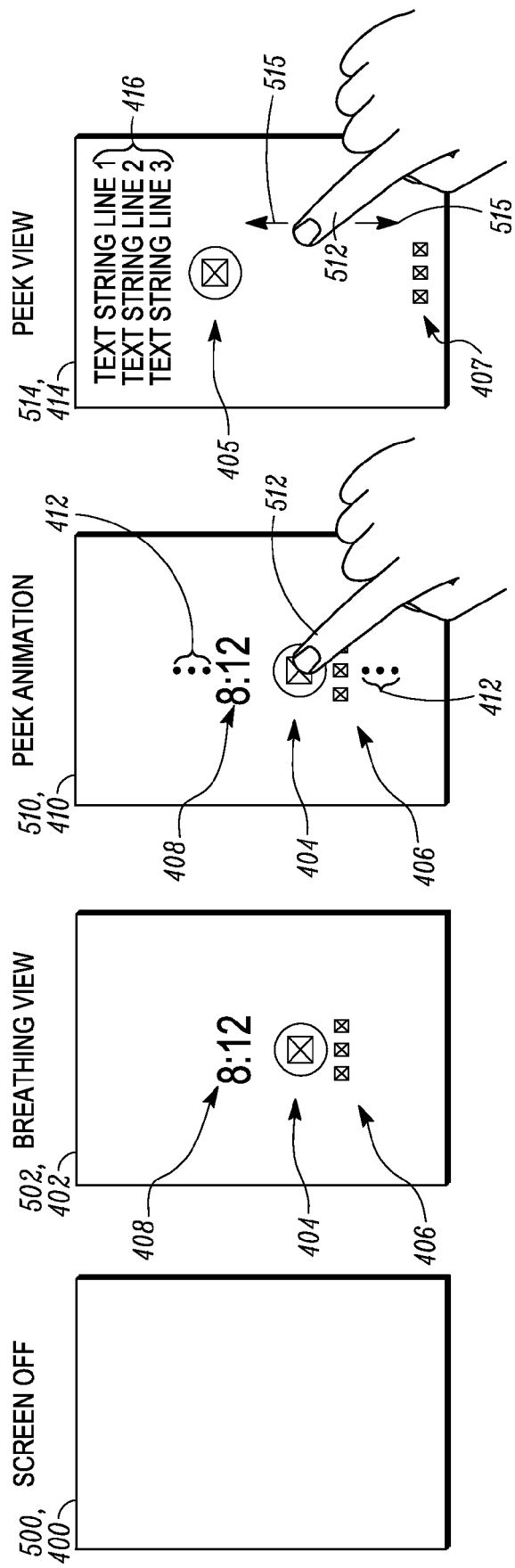

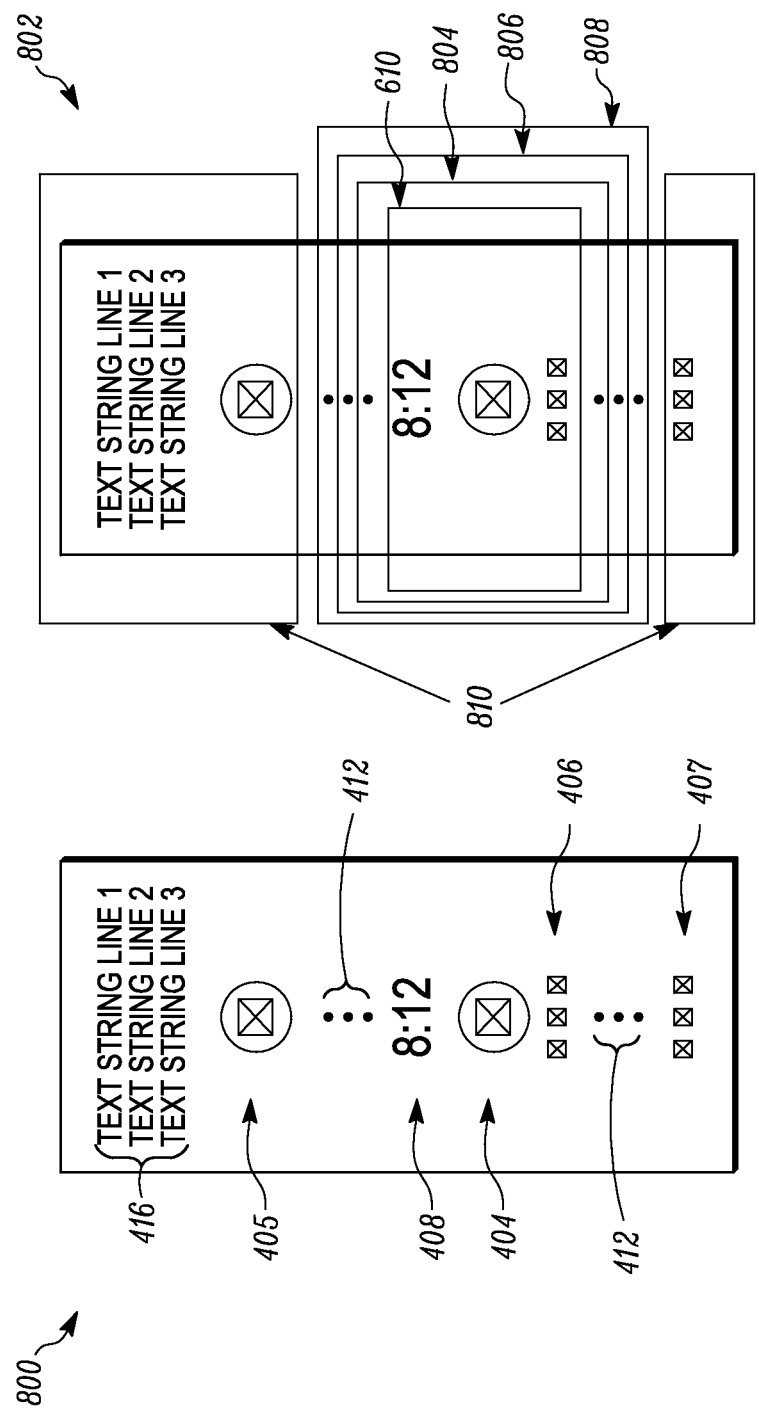

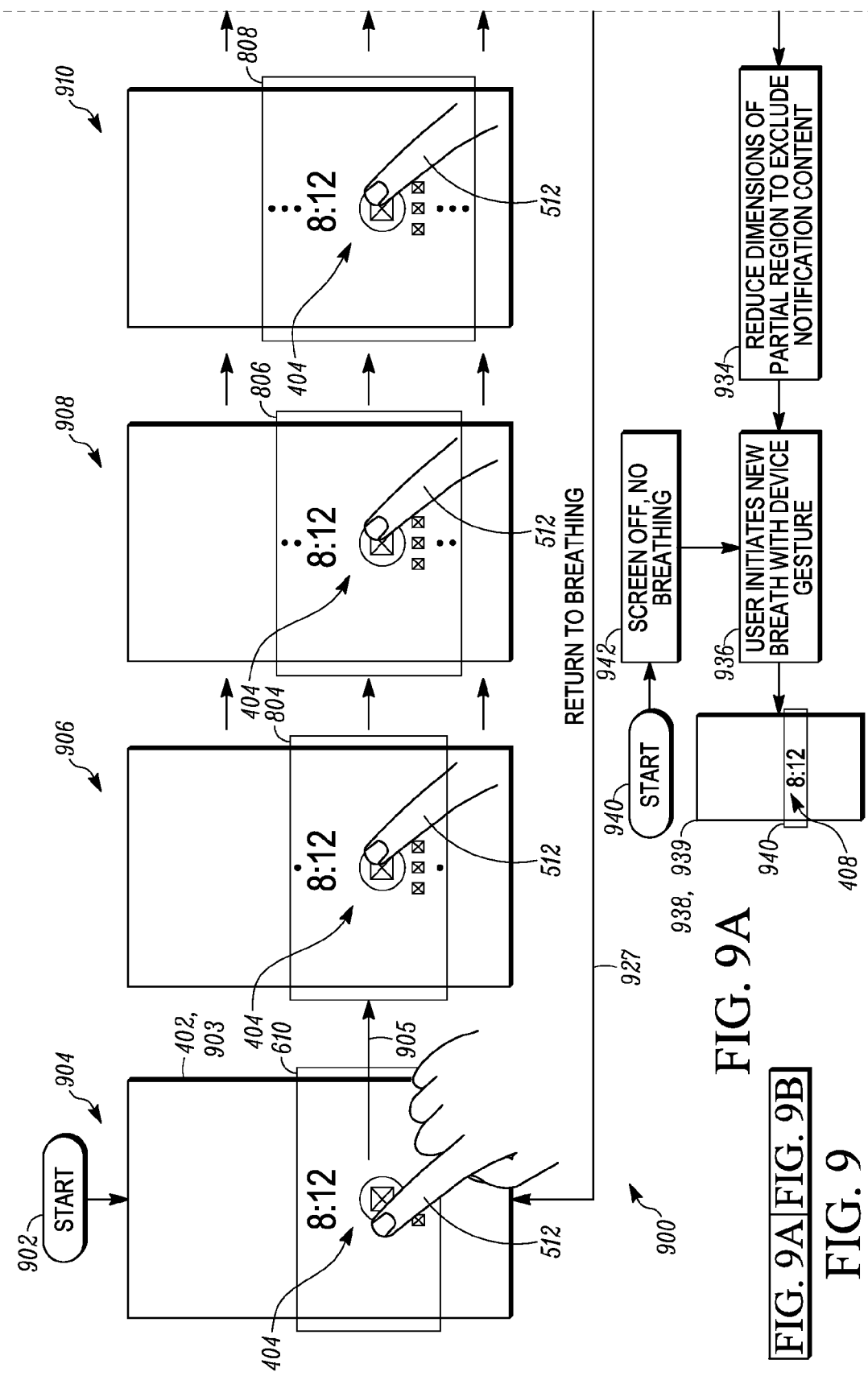

ELECTRONIC DEVICE WITH ENHANCED NOTIFICATIONS

CROSS REFERENCE TO RELATED APPLICATIONS

The present application is related to commonly assigned U.S. Provisional Patent Application No. 61/720,322, filed on 30 Oct. 2012, commonly assigned U.S. Provisional Patent Application No. 61/736,536, filed on 12 Dec. 2012; commonly assigned U.S. Provisional Patent Application No. 61/757,690, filed on 28 Jan. 2013, and commonly assigned U.S. patent application Ser. No. 13/836,987, filed on 15 Mar. 2013, from all of which benefits under 35 USC §120 are hereby claimed and the contents of all of which are hereby incorporated by reference herein.

FIELD OF THE INVENTION

The present invention relates generally to the field of electronic devices having notification features to provide specialized information to a user.

BACKGROUND OF THE INVENTION

The traditional "Notification LED" has lost its usefulness for anyone who gets a constant stream of notifications. For such users, such Leeds are constantly blinking and become incessant "noise" that provide little in the way of useful information and, indeed, an always-blinking LED drowns out important notifications. Additionally, devices employing such LEDs foster an operational paradigm of "fidgeting" in which the user must constantly wake the device simply to view the time or weed through such notifications. Such operation is both time consuming and cognitively draining.

In view of such concerns, and others, it would be advantageous if one or more improved methods of providing notifications to users of electronic devices, and improved electronic devices configured to perform such methods, could be developed.

BRIEF DESCRIPTION OF THE DRAWINGS

FIGS. 4A, 4B, 4C, and 4D are four example views of a display screen of the electronic device of FIGS. 1 and 2 during four different points of operation in accordance with the example process of FIG. 3;

FIGS. 5A, 5B, 5C, and 5D respectively show the example views of FIGS. 4A, 4B, 4C, and 4D of the display screen, respectively, in combination with illustrations of a user interacting with the display screen;

FIG. 8A is a view of an example of a full image in a frame buffer that can be displayed on the display screen of the electronic device at one or more times during the example process of FIG. 3, and FIG. 8B is a further view showing the full image of FIG. 8A additionally in relation to several example partial regions of the display screen;

DETAILED DESCRIPTION OF THE EMBODIMENTS

Figure 1:
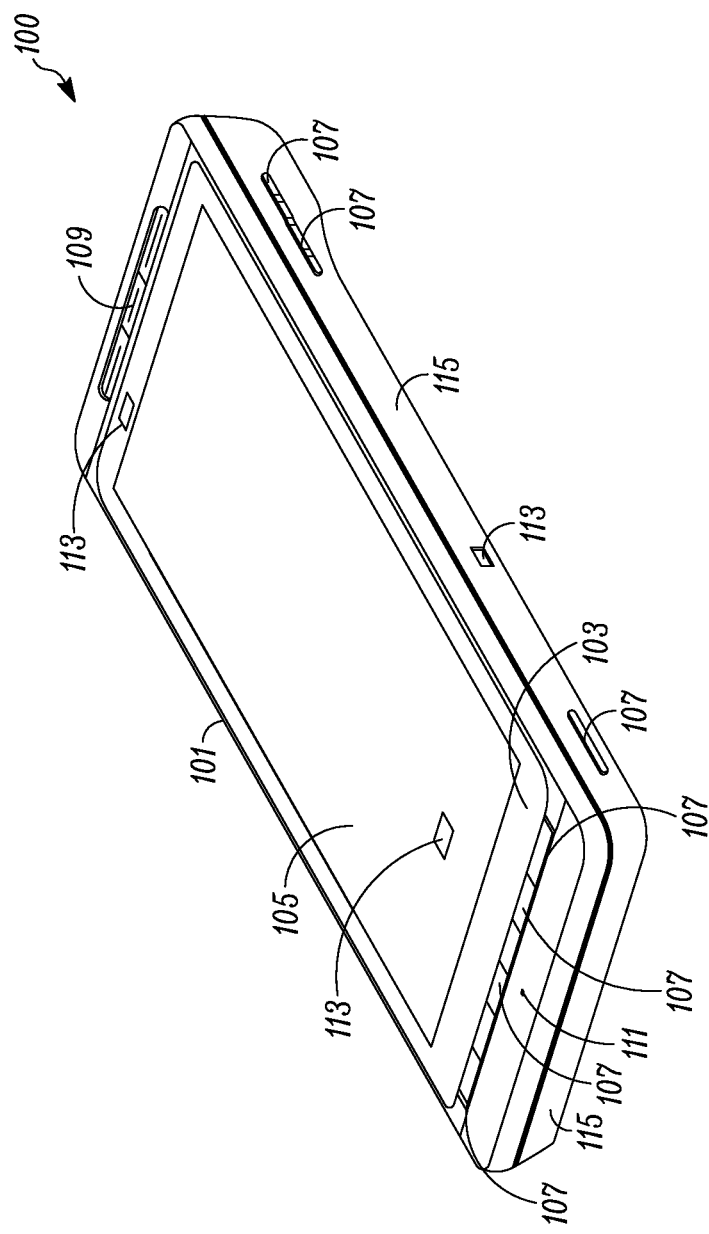
FIG. 1 is a perspective view of an example embodiment of an electronic device in accordance with the present disclosure.

The present inventors have recognized that a variety of enhancements can be provided to electronic devices so as to enable to the electronic devices to better provide notifications to users, and to the methods of operation of electronic devices in providing notifications. The present inventors have further recognized that, although mobile device displays and indeed the application processors of mobile devices are in a powered-down or "off" much or most of the time (e.g., in a "sleep mode"), so as to save on power consumed by such devices, such an "off" state of the display presents an opportunity for displaying the most relevant information at just the right time. Further, the present inventors have recognized that, because attention is a limited resource, in addition to showing the right information at the right time, displaying of notifications in this manner during the "off" state could also help reduce the amount of time it takes to access the most important notifications. By giving users the right amount of information at the right time, the users will be better informed to decide whether or not to pick up and actively use (unlock or turn "on") their device—or to simply dismiss such notifications and never have to unlock their device.

Additionally, the present inventors have also recognized that it is possible to allow for ongoing actuation of a mobile device display, even while the mobile device application processor and display are technically in a powered-down or "off" state, by implementing Smart Partial OLED display technology and a sensor hub (or other auxiliary processing device) for controlling a display using such technology, rather than using mobile device application processor, so as to achieve the displaying of notifications in a low-power (or lower-power) manner relative to normal "on" state operation of a display by way of the mobile device application processor. Embodiments operating in this manner can be consider as providing "always-on" operation insofar as, even though the mobile device (or at least the mobile device application processor) is powered-down or off, the display can still be actuated to display notifications when appropriate. That is, touch inputs can be received, while the display is in a lower power state that is more akin to an "off" state in terms of power usage, insofar as the display is "on" only periodically or otherwise to a limited extent. Such operation can be advantageous both in terms of reducing the rate of battery depletion, as well as reducing the chance that portions of a display might be overly illuminated for too great of time in a manner that could damage the display.

In at least some embodiments, the display of the "right information at the right time" is achieved by leveraging the Smart Partial OLED display system to display an optimized set of notifications while the screen is "off", where optimization can be achieved for example by way of intelligent prioritization/ranking based on various information such as various inputs/behaviors, and improved notification management. In this manner, the most important contextually-relevant information reaches the user, and particularly can be provided to the user when the user has a need for that information (in such cases, there can also be integration with personal assistant-type applications such as Google Now available from Google, Inc. of Mountain View, Calif. or Siri available from Apple, Inc. of Cupertino, Calif.).

Also, in at least some embodiments, the "always-on" operation provides users with a seamless or substantially seamless experience as the users utilize the device and the device transitions between the "screen off" state (lock screen) and the "on" state. In at least some example embodiments, the device comes alive while still in the "off" mode (e.g., where the application processor is still dormant) by showing incoming notifications as they occur, by providing "breathing" alerts on the screen without draining the battery, by coming alive when the device is picked up off of a surface such as a table. Also, in some example embodiments, the providing of notifications is entirely disabled by the device when the device recognizes a circumstance where the providing of notifications is inappropriate (e.g., when the device is face down, when the device is in a pocket, when it is nighttime, etc.).

Further, in at least some embodiments, the low-power operating capability of the OLED display during the "off" state of the device is further leveraged by operating the display in a manner by which important notifications are shown only on a small part of the screen. In some cases, not only does the display system display an optimized set of notifications while the screen is "off", without significantly impacting battery lift, but also the system allows for a select set of user interactions during this state, which also for avoiding significant impacts upon battery life. Also, in at least some cases, there can further be a continuous, cohesive experience between phone and watch operation. Also, at least some embodiments can provide a user-centric approach to security.

In view of the above, in at least some embodiments, the present disclosure relates to an electronic device including a receiver, a display, an application processor and a sensor hub. The receiver is configured to receive notifications from a remote device. The display is configured to provide information including notifications. The application processor and the sensor hub are in communication with the display. The application processor is configured to provide instructions for displaying full screen information at the display during a non-sleep mode of the electronic device. The full screen information includes a first notification associated with first information received by the electronic device during the non-sleep mode. The sensor hub is configured to provide instructions for displaying partial screen information at the display during a sleep mode of the electronic device. The partial screen information includes a second notification associated with second information received by the electronic device during the sleep mode.

Also, in at least some additional embodiments, the present disclosure relates to a method of operating an electronic device so as to provide notifications. Full screen information is provided at a display of the electronic device in response to instructions from an application processor during a non-sleep mode of the electronic device. The full screen information includes a first notification associated with first information received by the electronic device during the non-sleep mode. Also, partial screen information is provided at the display in response to instructions from a sensor hub during a sleep mode of the electronic device. The partial screen information includes a second notification associated with second information received by the electronic device during the sleep mode.

Additionally, in at least some embodiments, the present disclosure relates to a method of an electronic device for providing notifications. The method includes operating the electronic device in a higher-power mode of operation during which at least one application processor is active in controlling displaying by a display of the electronic device, and receiving a first notification. The method also includes determining that the first notification satisfies at least one criterion for display in a low-power mode of operation, and transitioning from the higher-power mode of operation to a lower-power mode of operation during which a sensor hub operates to provide at least one control signal to the display. The method further includes actuating the display, in response to at least one control signal received from the sensor hub, so that a first image portion identical to or based at least in part upon the first notification is displayed in a periodic manner in which at first times the displayed first image portion is displayed with at least one higher level of brightness and at second times the display first image portion is displayed with at least one lower level of brightness. The method also includes receiving a signal indicative of a user input corresponding to the first image portion, and taking at least one first action in response to the receiving of the signal.

Referring now to FIG. 1, there is illustrated a perspective view of an example electronic device 100. In the present embodiment, the electronic device 100 can be any type of device capable of providing touch screen interactive capabilities. Examples of the electronic device 100 include, but are not limited to, mobile devices, wireless devices, smart phones, tablet computing devices, personal digital assistants, personal navigation devices, touch screen input device, touch or pen-based input devices, portable video and/or audio players, as well as any of a variety of other electronic devices. It is to be understood that the electronic device 100 may take the form of a variety of form factors, such as, but not limited to, bar, tablet, flip/clam, slider and rotator form factors.

In the present example embodiment shown in FIG. 1, the electronic device 100 has a housing 101 comprising a front surface 103 which includes a touch screen display (that is a visible display) 105 that, together with certain other features discussed below, constitutes a user interface. In the present example, the touch screen display 105 is a touch screen including a touch-sensitive surface that overlays a display surface forming part of (or that is positioned just underneath or inwardly of) the front surface 103. In the present embodiment, the touch screen display 105 (and particularly the display surface thereof) employs organic light-emitting diode (OLED) technology. Further, the user interface of the electronic device 100 as shown can also include one or more input keys 107. Examples of the input key or keys 107 include, but are not limited to, keys of an alpha or numeric (e.g., alphanumeric) keypad (or other keyboard), physical keys, touch-sensitive surfaces, mechanical surfaces, multipoint directional keys, and side buttons or keys. Further as shown, the electronic device 100 can also comprise apertures 109, 111 for audio output and input along the front surface 103 (or other outer surfaces of the device).

Notwithstanding the particular features shown in FIG. 1, in an alternate embodiment, the electronic device can include other features. For example, in place of the touch screen display, in an alternate embodiment the electronic device can employ a touch-sensitive surface supported by the housing 101 that does not overlay (or is not overlaid by) any type of display. Indeed, although FIG. 1 shows particularly example display and user interface features, it is to be understood that the electronic device 100 can include a variety of other combinations of display and user interface features depending upon the embodiment.

Additionally as shown in FIG. 1, the electronic device 100 includes one or more sensors 113, a number of which are shown to be positioned at or within an exterior boundary of the housing 101 (and can be supported on or within the housing 101). More particularly, as illustrated by FIG. 1, in the present embodiment the sensor or sensors 113 can be positioned at the front surface 103 and/or another surface (such as one or more side surfaces 115) of the exterior boundary of the housing 101. In the present embodiment, at least some of the sensors 113 (whether at the exterior boundary or within the exterior boundary, i.e., internal to the housing) are configured to detect one or more predetermined environmental conditions associated with an environment external or internal to the housing. Further examples of the sensors 113 are described below in reference to FIG. 2.

Figure 2:
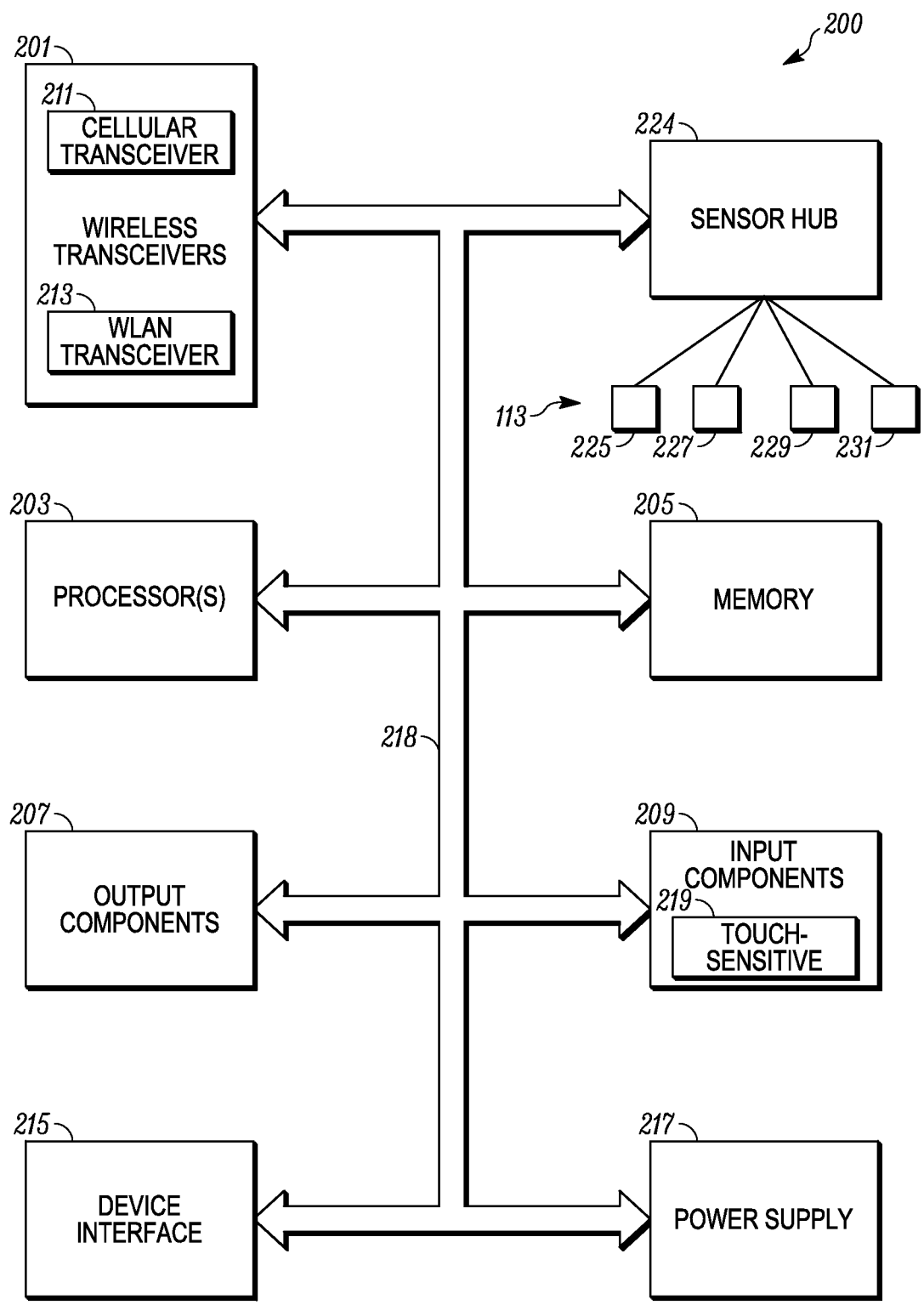
FIG. 2 is a block diagram representing example components of the electronic device of FIG. 1.

Referring to FIG. 2, there is shown a block diagram representing example components (e.g., internal components) 200 of the electronic device 100 of FIG. 1. In the present embodiment, the components 200 include one or more wireless transceivers 201, one or more processors 203, one or more memories 205, one or more output components 207, and one or more input components 209. As already noted above, the electronic device 100 includes a user interface, including the touch screen display 105, that comprises one or more of the output components 207 and one or more of the input components 209. Also as already discussed above, the electronic device 100 includes a plurality of the sensors 113, several of which are described in more detail below. In the present embodiment, the sensors 113 are in communication with (so as to provide sensor signals to or receive control signals from) a sensor hub 223.

Further, the components 200 further include a device interface 215 to provide a direct connection to auxiliary components or accessories for additional or enhanced functionality. In addition, the internal components 200 preferably include a power source or supply 217, such as a portable battery, for providing power to the other internal components and allow portability of the electronic device 100. As shown, all of the components 200, and particularly the wireless transceivers 201, processors 203, memories 205, output components 207, input components 209, sensor hub 223, device interface 215, and power supply 217, are coupled directly or indirectly with one another by way of one or more internal communication link(s) 218 (e.g., an internal communications bus).

Further, in the present embodiment of FIG. 2, the wireless transceivers 201 particularly include a cellular transceiver 211 and a Wi-Fi transceiver 213. Although in the present embodiment the wireless transceivers 201 particularly include two of the wireless transceivers 203 and 205, the present disclosure is intended to encompass numerous embodiments in which any arbitrary number of (e.g., more than two) wireless transceivers employing any arbitrary number of (e.g., two or more) communication technologies are present. More particularly, in the present embodiment, the cellular transceiver 211 is configured to conduct cellular communications, such as 3G, 4G, 4G-LTE, vis-à-vis cell towers (not shown), albeit in other embodiments, the cellular transceiver 211 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 213 is a wireless local area network (WLAN) transceiver configured to conduct Wi-Fi communications in accordance with the IEEE 802.11 (a, b, g, or n) standard with access points. In other embodiments, the Wi-Fi transceiver 213 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 213 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Although in the present embodiment each of the wireless transceivers 201 serves as or includes both a respective transmitter and a respective receiver, it should be appreciated that the wireless transceivers are also intended to encompass one or more receiver(s) that are distinct from any transmitter(s), as well as one or more transmitter(s) that are distinct from any receiver(s). In one example embodiment encompassed herein, the wireless transceiver 201 include at least one receiver that is a baseband receiver.

Exemplary operation of the wireless transceivers 201 in conjunction with others of the components 200 of the electronic device 100 can take a variety of forms and can include, for example, operation in which, upon reception of wireless signals (as provided, for example, by remote device(s)), the internal components detect communication signals and the transceivers 201 demodulate the communication signals to recover incoming information, such as voice and/or data, transmitted by the wireless signals. After receiving the incoming information from the transceivers 201, the processors 203 format the incoming information for the one or more output components 207. Likewise, for transmission of wireless signals, the processors 203 format outgoing information, which can but need not be activated by the input components 209, and conveys the outgoing information to one or more of the wireless transceivers 201 for modulation so as to provide modulated communication signals to be transmitted. The wireless transceiver(s) 201 convey the modulated communication signals by way of wireless (as well as possibly wired) communication links to other devices (e.g., remote devices).

Depending upon the embodiment, the output and input components 207, 209 of the components 200 can include a variety of visual, audio and/or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm and/or buzzer, and/or one or more mechanical output devices such as a vibrating mechanism or motion-based mechanism. Likewise, by example, the input device(s) 209 can include one or more visual input devices such as an optical sensor (for example, a camera lens and photosensor), one or more audio input devices such as a microphone, and one or more mechanical input devices such as a flip sensor, keyboard, keypad, selection button, navigation cluster, touch pad, capacitive sensor, motion sensor, and switch.

As noted, the user interface and particularly the touch screen display 105 of the electronic device 100 of FIG. 1 can be considered to constitute or include both one or more of the input components 209, particularly a touch-sensitive input component 219 shown in FIG. 2, and one or more of the output components 207. Further, it should be appreciated that the operations that can actuate one or more of the input devices 209 can include not only the physical pressing/actuation of the touch screen display 105 or buttons or other actuators of the user interface or otherwise, but can also include, for example, opening the electronic device 100 (if it can take on open or closed positions), unlocking the electronic device 100, moving the electronic device to actuate a motion, moving the electronic device to actuate a location positioning system, and operating the electronic device.

In the present embodiment, one or more of the input components 209, such as one or more input components encompassed by the user interface such as the touch-sensitive component 219 shown in FIG. 1, can produce an input signal in response to detecting a predetermined gesture. In this regard, the touch-sensitive component 219 can be considered a gesture sensor and can be or include, for example, a touch-sensitive sensor having a touch-sensitive surface substantially parallel to the display. The touch-sensitive sensor can include at least one of a capacitive touch sensor, a resistive touch sensor, an acoustic sensor, an ultrasonic sensor, a proximity sensor, or an optical sensor.

As mentioned above, the components 200 also can include one or more of various types of the sensors 113. Although the sensors 113 are for the purposes of FIG. 2 shown to be distinct from the input devices 209, the sensors can also be considered as being encompassed among the input devices 209. In alternate embodiments, one or more of the input devices can be encompassed among the sensors, one or more of the sensors can be considered distinct from the input devices, one or more of the input devices can be considered distinct from the sensors, or all of the sensors can be considered distinct from all of the input devices and vice-versa.

With respect to the sensors 113 particularly shown in FIG. 2, these particularly include various sensors 225-231 that are examples of sensors that can be included and/or utilized by the electronic device 100. As already noted, as shown in FIG. 2, the various sensors 225-231 in the present embodiment can be controlled by the sensor hub 223, which can operate in response to or independent of the processor(s) 203. The various sensors 225-231 can include, but are not limited to, one or more power sensors 225, one or more temperature sensors 227, one or more pressure sensors 227, one or more moisture sensors 229, and one or more ambient noise sensors 231.

Further in regard to the present embodiment, and as discussed further below in regard to FIGS. 3-10B, it should further be understood that the sensor hub 223, in addition to controlling the various sensors 225-231, also serves to control operation of the touch screen display 105 of the user interface (and the functionality that supports it) when the electronic device 100 and particularly the touch screen display is considered to be "off", including times at which the electronic device is operating in a "breathing mode" of operation as described below. This is in contrast to times at which the electronic device 100 is awake or "on", during which times the touch screen display 105 of the user interface (and the functionality that supports it) is under the control of the processor(s) 203, which can be considered application processor(s). This manner of operation involving control by the sensor hub 223 at times when the electronic device is "off" is advantageous because the sensor hub consumes substantially less power than the processors 203 therefore operation under the control of the sensor hub can be provided with substantially less battery drain than operation under the processor(s) 203.

Although the various sensors 225-231 are shown in FIG. 2, in other embodiments one or more of numerous other types of sensors can also be included among the sensors 113 including, for example, one or more motion sensors, including for example one or more accelerometers or Gyro sensors (not shown), one or more light sensors, one or more proximity sensors (e.g., a light detecting sensor, an ultrasound transceiver or an infrared transceiver), one or more other touch sensors, one or more altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the electronic device 100.

With respect to the processor(s) 203, the processor(s) can include any one or more processing or control devices such as, for example, a microprocessor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the electronic device 100, such as interaction among the various components included among the components 200, communication with external devices via the wireless transceivers 201 and/or the device interface 215, and storage and retrieval of applications and data, to and from the memories 205. Each application includes executable code that utilizes an operating system to provide more specific functionality, such as file system service and handling of protected and unprotected data stored in the memories 205. Such operating system and/or application information can include software update information (which can be understood to potentially encompass update(s) to either application(s) or operating system(s) or both). As for informational data, this is non-executable code or information that can be referenced and/or manipulated by an operating system or application for performing functions of the electronic device 10.

It is to be understood that FIG. 2 is provided for illustrative purposes only and for illustrating components of an electronic device in accordance with the present invention, and is not intended to be a complete schematic diagram of the various components required for an electronic device. Therefore, an electronic device can include various other components not shown in FIG. 2, or can include a combination of two or more components or a division of a particular component into two or more separate components, and still be within the scope of the present invention.

Figures 3, 3B:
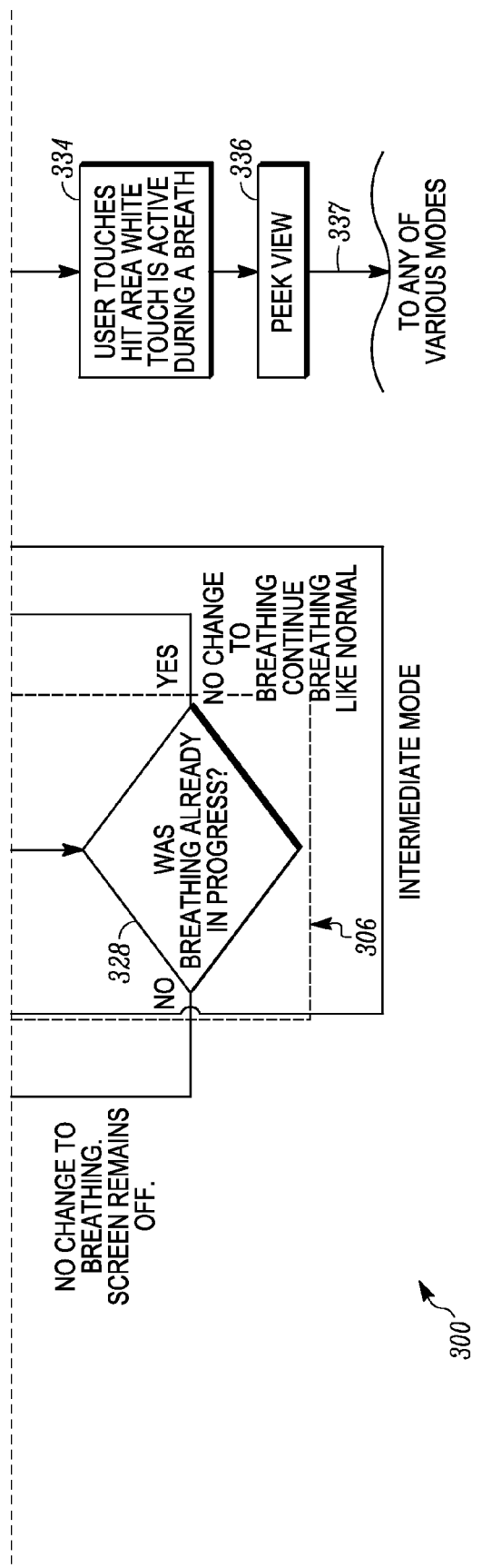
FIG. 3 (represented by FIGS. 3A and 3B) is a flow chart showing an example process performed by the electronic device of FIGS. 1 and 2 in accordance with one embodiment of the present disclosure.

Referring now to FIG. 3 (represented by FIGS. 3A and 3B), a flowchart 300 shows an example process performed by the electronic device 100 shown in FIGS. 1 and 2. The flowchart 300 particularly illustrates example steps of operation of the electronic device 100 as the electronic device proceeds among different operational modes or states, mainly, a "fully awake" or "on" mode of operation during which the processors 203 are operating (that is, the application processors are up and running), an "off" mode of operation, and an "intermediate" mode of operation during which breathing and peeking processes (as discussed in further detail below) occur or can occur. Although in the present embodiment the processors 203 are off or powered-down during the off mode and intermediate mode of operation (by contrast to operation in the fully awake mode, during which the processors 203 are up and running), as will be described further below it is still possible for the electronic device 100 to operate during one or both of the off mode and intermediate mode in manners that involve some display functionality by the touch screen display 105 (including potentially both outputting of information and receiving of inputs). Such operation of the touch screen display 105 during the intermediate mode and/or off mode is achieved by virtue of control functionality provided by the sensor hub 223.

More particularly, in FIG. 3 (represented by FIGS. 3A and 3B), portions of the process represented by the flow chart 300 that occur in the fully awake mode are shown within a fully awake mode region 302, and portions of the process that corresponds to the off mode are shown in a region 304. This being the case, it should further be appreciated that all of the remaining portions of the process shown in FIG. 3, excluding the portions shown in the regions 302 and 304, are portions of the process that are performed during the intermediate mode of operation, and are referred to as being within a region 306 shown in FIG. 3. It should further be appreciated that, generally speaking, operation in the fully awake mode is associated with a normal power mode of the processors 203 (application processors) and/or a substantially active mode of those processors. By contrast, the intermediate mode of operation and off mode of operation are associated with a low power (or even completed powered-off) mode of the processors 203 (application processors) and/or a substantially inactive mode of those processors. Given the above, the intermediate mode of operation can also be referred to as an "Always on Display" mode (AoD) mode or "sleep" mode (and/or the off mode potentially can also be encompassed generally within the "sleep" mode), in contrast to the fully awake mode, which can be referred also to a "non-sleep" mode.

Additionally as will be described further below, in at least some embodiments disclosed herein, one or more notifications can be displayed by the electronic device 100 in a "non-sleep" mode such as the fully awake mode and also one or more notifications can be displayed by the electronic device in a "sleep" mode such as the intermediate or AoD mode (including submode portions thereof as described). In at least some such embodiments, the notifications provided in the fully awake mode or "non-sleep" mode are notifications received during operation in that mode, and that are displayed by way of activation of the entire, or substantially the entire, display screen (e.g., full screen information is displayed, where the full screen information includes data corresponding to substantially all pixels capable of being displayed by the display). Further in such embodiments, in contrast, the notifications provided in the intermediate mode or "sleep" mode are notifications received during operation in that mode, and that are displayed by way of activation of only a portion or portions of the display screen (particularly portion(s) that are substantially less than the entire display screen and/or display substantially less that the full screen information, that is, information corresponding to less or substantially less than all pixels capable of being displayed by the display).

Further referring to FIG. 3 (represented by FIGS. 3A and 3B), as indicated by first and second start regions 308, the process represented by the flow chart 300 can begin either in the fully awake mode or the off mode. Operation in the fully awake (or on) mode begins particularly with a step 310, at which the touch screen display (or other display screen) 105 is on. It should be understood that, during such fully awake mode operation, the electronic device 100 can (and typically does) receive one or more notifications. Such notifications can take any of a variety of forms including, for example. email messages, short message service (SMS) text messages, various updates or alerts, or other forms, and such notifications can be received at the electronic device 100 in any of a variety of manners including, for example, by way of wireless signals received via the wireless transceivers 201 from other electronic devices such as remote devices (not shown). In response to receiving such notifications, or signals or other information giving rise to notifications, in the fully awake mode, the electronic device 100 typically will display notifications on the touch screen display 105 corresponding to the received notifications, signals, or information. Such display, under the control of the processors 203, typically involves actuation of the entire touch screen display.

Nevertheless, at some point during the operation of the electronic device 100 in fully awake mode, as represented by a step 312, the touch screen display can turn off as a result of a timeout (a the passing of a predetermined amount of time during which no activity or activities of predetermined type(s) have occurred), as a result of a toggle button pressed by the user, or as a result of other condition(s) being met. When this occurs, the process then advances to a step 314, at which the off mode is entered and the touch screen display 105 remains off (to be clear, at this step in the off mode, no breathing or other intermediate mode functionality is performed). It should further be noted that the process represented by the flow chart 300 can also begin, as indicated by one of the start regions 308, at this step 314 as well, which reflects the possibility that the process starts at a time when the electronic device 100 is already in the mode.

Further as shown, if a power button press occurs at a step 316 while the screen is in the off mode, then the electronic device 100 can return to the fully awake mode, by proceeding from the step 316 to a step 318, at which the electronic device is awakened, after which the process again returns to the step 310 at which the touch screen display 105 is on. Alternatively, however, if while the electronic device is in the off mode and the touch screen display 105 is off at the step 314 and a new notification arrives as represented by a step 320, then the electronic device 100 also re-enters the fully awake mode. As already discussed above in regards to the step 310, depending upon the embodiment or circumstance the received notification can take any of a variety of forms. Further, upon receipt of a new notification at the step 320, then at a step 322 filtering is applied by the electronic device 100 to determine whether or not the received notification satisfies one or more criteria such that the notification is appropriate for being displayed in any particular manner.

The filtering that is performed at the step 322 can vary depending upon the embodiment or circumstance. For example, in some embodiments, certain types of notifications are "blacklisted", that is, automatically determined to be not worthy of triggering operation of the electronic device 100 that would result in immediate display of those items. In some such embodiments, some or all of the rules defining what types of notifications are "blacklisted" can be static, but in other embodiments, some or all of the rules are user-modifiable (e.g., the user can select and modified by a user of the electronic device through a settings feature of the electronic device). Also, in some such example embodiments, the rules are global in terms of the rules impacting whether the notification is synced to all end points (e.g., a phone, a watch, a personal computer operating a browser such as Chrome browser available from Google, Inc. of Mountain View, Calif.), but in other such example embodiments the rules are not global. Further for example, in some embodiments certain types of notifications are "whitelisted", that is, automatically determined to be worthy of triggering operation of the electronic device 100 that would result in immediate display of those items.

Further, in regards to such filtering, it should also be appreciate that the filtering that is performed vary depending upon whether the electronic device 100 is operating in the fully awake mode, in the intermediate mode, or in the off mode. Indeed, more generally, the filtering that is performed can vary generally with respect to the mode of operation of the electronic device, and it should be understood that the present disclosure envisions the possibility of embodiments (and encompasses embodiments) in which there are more modes of operation of the electronic device other than the fully awake mode, intermediate mode, and off mode, and also envisions that the modes of the electronic device can include "sub-modes" corresponding to operations that constitute sub portions of the functionality associated with any given mode of operation—for example, modes such as a breathing mode of operation and a peek view mode of operation can be considered to be sub-modes encompassed by the intermediate mode as discussed in further detail below. Notwithstanding the particular terminology used here in to refer to various modes (and sub-modes), it should be appreciated that other terminology can also be chosen to refer to these modes (and sub-modes) as well. For example, it is possible that the term "breathing mode" can be used to refer to all functionality described herein as being associated with the "intermediate mode", including "peek view mode" operation, and that the particular functionality associated with the "breathing mode" as described herein can be referred to in a different manner. (Nevertheless, for purposes of the description provided herein, the "intermediate mode" encompasses the "breathing mode" and "peek view mode" operation).

Additionally, it should be appreciated that filtering can encompass numerous different types of filtering steps and processes depending upon the embodiment or circumstance including, for example, a variety of different type of rule application steps, ranking steps, and/or steps involved with processing or mining data (e.g., analyzing or cross-referencing strings of text or detecting names in various text strings) packages, or applications.

Subsequent to (or as a conclusion of) the step 322, as further represented by a step 324, the electronic device 100 determines whether, based upon the filtering, the received notification does meet one or more criteria for display in the intermediate mode (or AoD mode as noted above). If so, as shown in FIG. 3 the process leaves the fully awake mode and enters the intermediate mode as indicated by an arrow 325 crossing out of the fully awake mode region 302 and entering the intermediate mode region 306. More particularly, upon entering the intermediate mode region 306, the process particularly reaches a step 326 at which breathing operation is begun (or, if already being performed, continues to be performed). Example breathing operation, which can be referred to as operation in the breathing mode (which as noted above can be considered a sub-mode of the intermediate or AoD mode), is described in further detail below with respect to FIGS. 4A through 10B.

Alternatively, if at the step 324 it is determined that the received notification does not (based upon the filtering of the step 322) meet the criteria for display in the intermediate mode, then the process advances from the step 324 to a step 328. At the step 328, it is determined by the electronic device 100 whether breathing operation (in accordance with the breathing mode) was already in progress and being performed. If breathing operation was already in progress, then the process advances from the step 328 back to the step 326, and the breathing operation already going on continues on with no change, that is, the electronic device continues unabatedly to perform breathing operation like normal. However, if at the step 328 it is determined that the breathing operation was not already in progress, then the process returns from the step 328 back to the step 314 such that the process returns to the off mode and particularly the touch screen display 105 is off and no breathing is occurring (accordingly, there is no change to the breathing operation and the screen remains off).

As additionally shown in FIG. 3 (represented by FIGS. 3A and 3B), and discussed in further detail below with respect to FIGS. 4A through 10B, when the electronic device 100 has reached the step 326 of the intermediate mode so as to be operating in the breathing mode, breathing operation can then continue on indefinitely. Nevertheless, there are several actions or events can occur that cause the breathing operation to be stopped and/or to cause the mode of operation to change. First, as shown in FIG. 3 by a step 330, if a power button press is received at the electronic device 100, then the electronic device returns to the fully awake mode and particularly the process advances to a step 332 within the fully awake mode region 302 in which the electronic device is awakened (and particularly the processors 203 are powered on) and accordingly the breathing operation of the step 326 is ended. Such a power button press operation can also be considered a "home button" press, if one views the fully awake mode as a "home" mode. Following the step 332, the process then additionally returns to the step 310, at which the touch screen display 105 is on (and received notifications are displayed thereon).

Alternatively, as represented by an arrow 333 linking the step 326 to the step 320, it is also possible during the breathing operation of the step 326 that a further new notification is received by the electronic device 100, as represented again by the step 320. If this occurs, then the process again advances through the steps 320, 322, 324, and possibly the step 328, after which the process returns to the step 326. That is, when a new notification is received, ultimately the breathing operation of the step 326 continues, either because the received notification meets the criteria for being displayed in the intermediate mode as determined at the step 324, or because breathing operation has already been in progress as determined at the step 328. It should be appreciated that, although the steps 320, 322, 324, and 328 are shown to be encompassed within the fully awake mode region 302, it is possible in alternate embodiments that these steps of receiving a new notification when the electronic device 100 is in the breathing mode and filtering and responding to the new notification can all be performed as part of the intermediate mode of operation, in at least some alternate embodiments.

Additionally as shown in FIG. 3 (represented by FIGS. 3A and 3B), in some circumstances, during the breathing operation of the step 326, a user can touch a "hit area" on the touch screen display 105, particularly at a time when the touch is active during a breath, as described in more detail below with respect to FIG. 9 (represented by FIGS. 9A and 9B). If such a touch occurs at a step 334, then the process advances to a step 336, in which the electronic device 100 remains in the intermediate mode (AoD mode) of operation but in which a peek view can occur. Such peek view operation represented by the step 336 can be considered to constitute a peek view mode of operation that is a submode of the intermediate mode (the transition step 334 at which the user touches the hit area can be considered to be part of either the breathing mode or the peek view mode). Execution of operations as part of the peek view mode as represented by the step 336 can ultimately, as discussed in relation to FIG. 9, result in the process returning to any of a variety of modes, as represented by an arrow 337 of FIG. 3, including the breathing mode (corresponding to the step 326), the fully awake mode, or the off mode.

Finally, also as shown in FIG. 3 (represented by FIGS. 3A and 3B), it is also possible that during operation in the breathing mode corresponding to the step 326 that an incoming call, alarm, or other wakeup event not initiated by a power key (or button) press or touch screen interaction or encompassed within the notifications addressed by the step 320 (in other words, some other type of notification that does not correspond to any of the steps 320, 330, or 334) will occur. If such an event occurs, then the process of the flow chart 300 advances to a step 339 at which the electronic device 100 is awakened and the fully awake mode region 302 is reached again. However, subsequent to the step 339, if there occurs a time at which the touch screen display 105 turns off as represented by a step 340, then the process returns back to the intermediate mode and particularly to the step 326 and breathing again resumes.

Referring now to FIGS. 4A, 4B, 4C, and 4D, respectively, first, second, third, and fourth example views of the touch screen display 105 of the electronic device 100 are shown that are intended to illustrate example operation of the touch screen display in displaying images during various portions of the process represented by the flow chart 300 of FIG. 3 (represented by FIGS. 3A and 3B), particularly during the breathing and peek view modes encompassed the intermediate mode (the portions of the process corresponding to the intermediate mode region 306). FIG. 4A particularly shows a blank image 400 that appears when the touch screen display 105 is completely off. As discussed further below in regard to FIG. 6, the blank image 400 appears at particular times during breathing operation corresponding to the step 326.

By contrast, FIG. 4B shows a breathing view image 402 that, rather than being blank, instead includes one or more image portions that are displayed by the touch screen display 105, and which the present example particularly include an icon 404 that can constitute a hit area that can be touched by a user during operation in the breathing mode (e.g., at the step 334 of FIG. 3), additional icons 406 that also can constitute an additional hit area (or areas), and a time display 408. As discussed further with respect FIG. 6 (and FIG. 7), the breathing view image 402 does not remain consistently on at all times during operation in the breathing mode, but rather periodically becomes visible and then disappears (at which times the touch screen display 105 again takes on the blank image 400 of FIG. 4A.

Next, with respect to FIG. 4C, a peek animation image 410 is illustrated. As shown, the peek animation image 404 also includes one or more image portions that are displayed by the touch screen display 105, and more particularly in this embodiment these one or more image portions include not only all of the image portions shown in FIG. 4B (namely, icon 404, icons 406 and time display 408) but also additionally include animation features 412, which in the present example include upper and lower (that is, above the time display 408 and below the icons 406) vertically-extending columns of three dots. As further discussed below, the animation features 412 particularly are displayed by the touch screen display 105 during transitioning between a time during the breathing mode at which a touch can be received (e.g., a time at which the breathing view image 402 shown in FIG. 4B is displayed), and a time at which the peek view mode has been fully entered and a peek view image such as an example image shown in FIG. 4D is displayed. As with the step 334 of FIG. 3, the displaying of the peek animation view of FIG. 4C can be considered either as part of the breathing mode or as part of the peek view mode.

Additionally, with respect FIG. 4D, the peek view image 414 shown therein is an example of an image that can be displayed by the touch screen display 105 once peek view mode has been entered. As shown, the peek view image 414 no longer includes the exact same arrangement of image portions shown in the peek animation view 410, albeit some of the image portions are the same in terms of their respective appearances. More particularly, the peek view image 414 in contrast to the peak animation image 410 no longer has the animation features 412 or time display 408, but continues to have an icon 405 identical in appearance to the icon 404 and icons 407 identical in appearance to the icons 406, except insofar as the icon 405 is now at a location that is moved upwards relative to the location of the icon 404 in the peek animation view (above the location of the uppermost dot of the upper column of dots of the animation features) and the icons 407 are now at a location that is moved vertically downward relative to their previous location in the peek animation view (below the location of the lowermost dot of the lower column of dots of the animation features).

Further, in the peek view image 414, one or more (in this example, three) text strings lines 416 are also displayed, above the icon 405. The text string lines 416 can include message information or information corresponding to one or more past notifications received by the electronic device 100. The display of these text string lines thus allows the user to "peek" at the notifications that have been received (e.g., recently received) by the electronic device 100, and is therefore the feature of this manner of operation giving rise to the "peek view mode" terminology used herein.

Referring additionally to FIGS. 5A, 5B, 5C, and 5D, first, second, third, and fourth additional views 500, 502, 510, and 514, respectively. The first, second, third, and fourth views 500, 502, 510, and 514 respectively encompass the respective blank, breathing view, peek animation view, and peek view images 400, 402, 410, and 414 that are shown in FIGS. 4A, 4B, 4C, and 4D, respectively, but also show those images in combination with illustrations of a user—particularly a finger 512 of the user's hand—interacting with those images. Because it is envisioned that the finger 512 of the user has not yet approached the touch screen display in the case of the blank image 400 and breathing view image 402, the first additional view 500 of FIG. 5A merely again shows the blank image 400, and the second additional view 502 of FIG. 5B merely again shows the breathing view image 402. By contrast, with respect to the third additional view 510 of FIG. 5C, there it is envisioned that the user has already touched the touch screen display 105 with the user's finger 512 and this has given rise to display of the peek animation view 410. In particular, it should be noted that the finger 512 is touching on the icon 404, which constitutes one of the hit areas on the touch screen display 105 in this example. Further, it is because of (in response to) the user's finger 512 touching the hit area that animation features 412 are shown to have appeared (as discussed in more detail below in regard to FIG. 9, represented by FIGS. 9A and 9B, the animation features progressively appear as a response to the touching of one of the hit areas).

Finally, at FIG. 5D, the fourth additional view 514 shows the peek view image 414 of FIG. 4D and also again shows the user's finger 512 to still be proximate to (touching) the touch screen display 105. As represented by arrows 515, while in the peek view mode of operation, the user can further provide a gesture (or gesture portion) so as to actuate the electronic device 100 to perform one of several different actions or transition to any of several different modes (again as discussed further below in reference to FIG. 9, represented by FIGS. 9A and 9B). In the present example, gestural actuation of the electronic device 100 in this regard particularly is not accomplished until, in addition to originally touching one of the hit areas (again, in this example, one of the icons 404 and 406) during the breathing mode of operation, the user then further: (i) continues to continuously touch that hit area during the transitioning from the breathing mode to the peek view mode (e.g., continues to touch one of the icons 404, 406 as the touch screen display transitions from the breathing view 402 to the peak animation view 410 and ultimately to the peek view 414); (ii) then manipulates the finger 512 to slide upward or downward (e.g., in accordance with either of the arrows 515 of FIG. 5D) until the finger reaches an appropriate one of the image portions of the peek view image corresponding to the hit area that was originally touched (e.g., reaches one of the icons 405, 407 as shown in the peek view 414), and (iii) then releases the hit area by removing the finger 512 from the touch screen display.

Figure 3A:
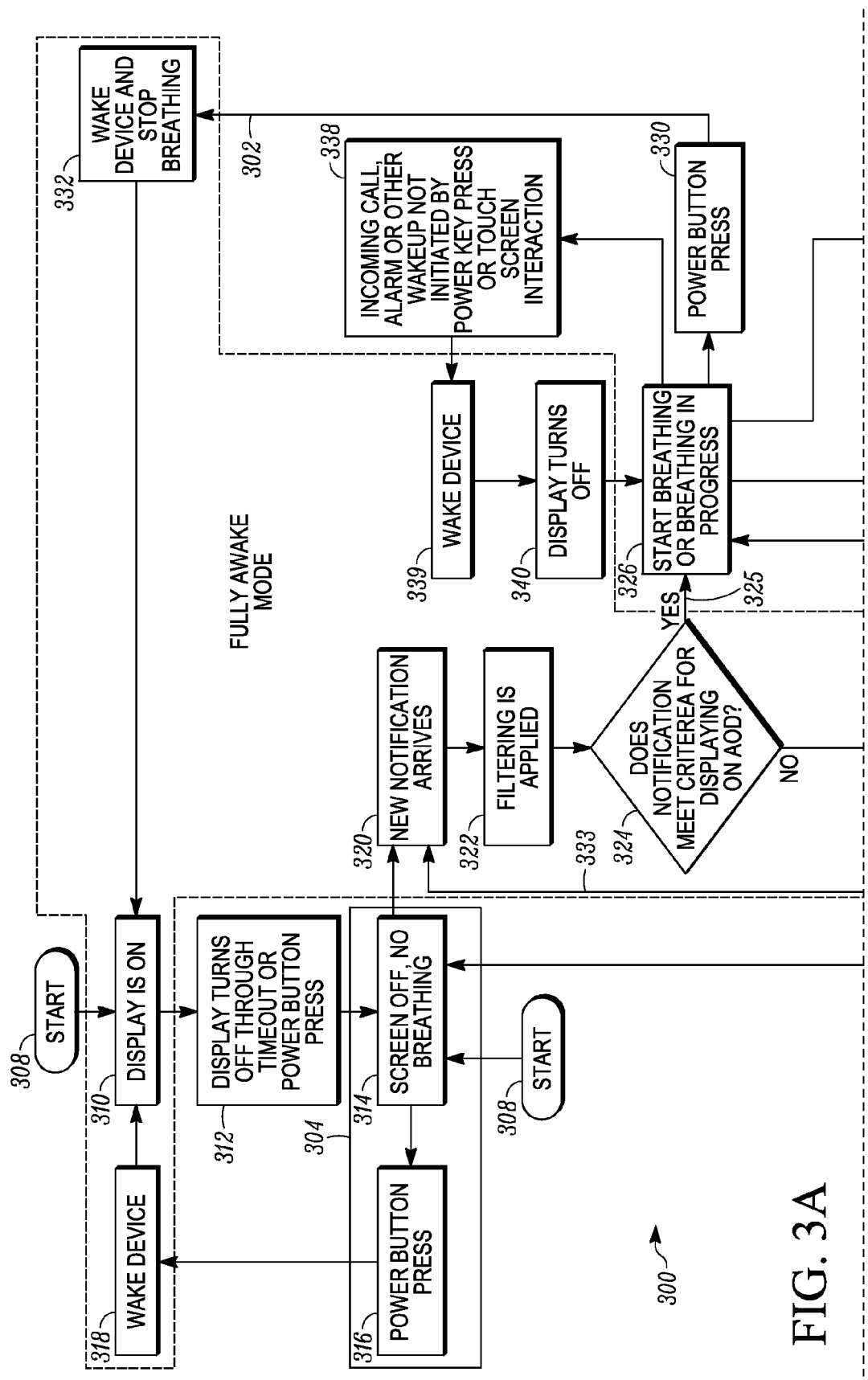
Figure 6:
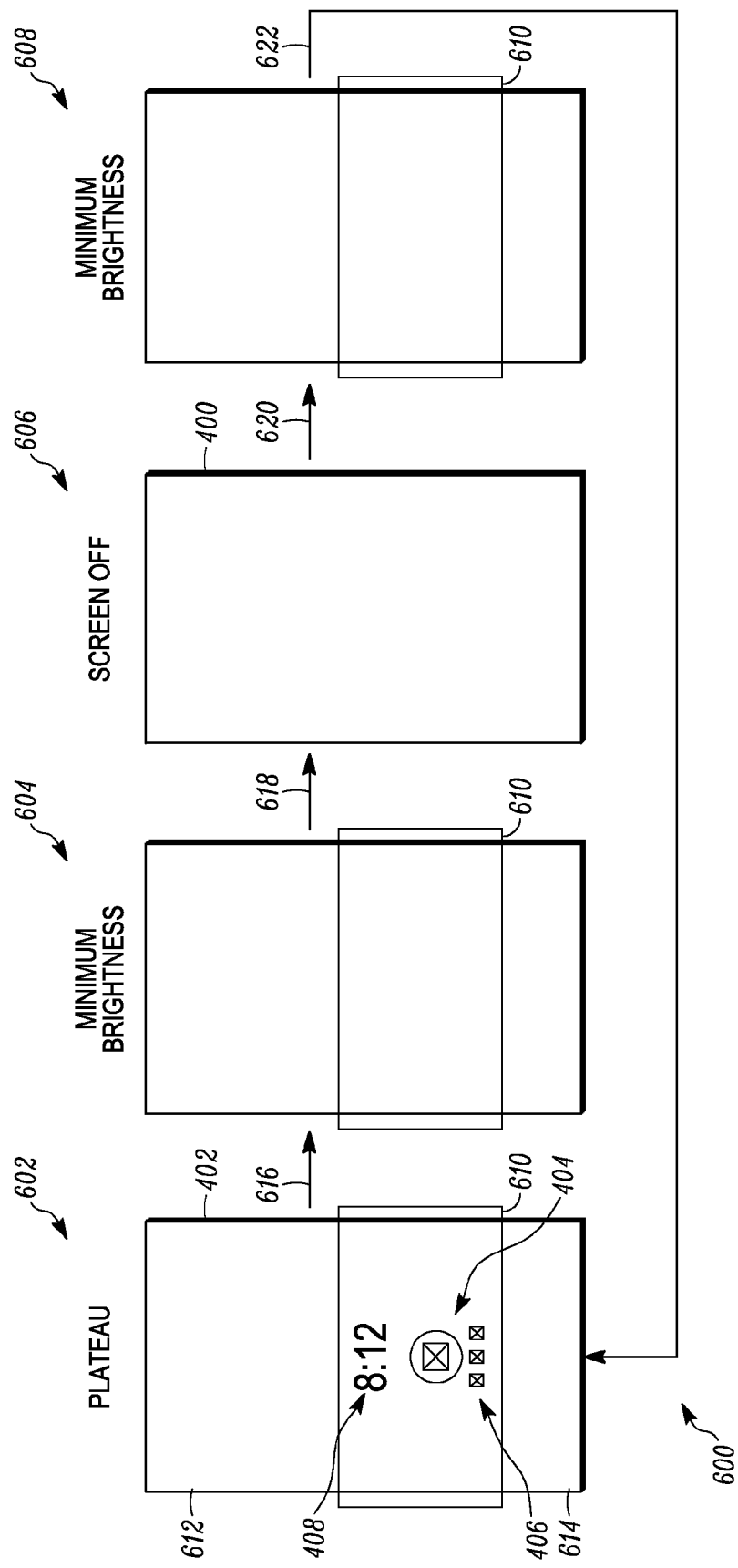
FIG. 6 is a modified flow chart illustrating, partly by way of a series of additional example views of the display screen of the electronic device of FIGS. 1 and 2, operation of the electronic device during a breathing mode portion of the process of FIG. 3.

Turning now to FIG. 6, a modified flow chart 600 is provided to illustrate example operation of the electronic device 100, and more particularly operation of the touch screen display 105 of the electronic device, during operation in the breathing mode corresponding to the step 326 of the process of the flow chart 300 of FIG. 3 (represented by FIGS. 3A and 3B). The modified flow chart 600 includes first, second, third, and fourth steps 602, 604, 606, and 608, respectively, of the operation in the breathing mode. The first step 602 particularly represents a stage of breathing operation in which a breathing view image is displayed on the touch screen display 105 at maximum brightness. As an example, FIG. 6 shows the breathing view image 402 of FIG. 4B to be the breathing view image that is displayed (which again includes the icon 404, icons 406, and time display 408). However, it should be appreciated that the breathing view image 402 is merely one example of many images and image portions that can be displayed as the breathing view image. Display of the breathing view image at the maximum brightness can also be referred to as providing the breathing view image at a breathing plateau, as will be described further in relation to FIG. 7.

Of further significance in regard to the step 602 is that it can be seen that all of the relevant displayed image portions (again, the icon 404, icons 406, and time display 408) are located within a first partial region 610. With respect to the first partial region 610, it should be understood that this is not a physical feature but rather is merely defines a region encompassing a portion of the space occupied by the touch screen display as well as possibly a portion of space outside of the confines of that display. Thus, although the partial region 610 in the present example is shown as extending beyond the confines of the breathing view image 402, which corresponds to the physical boundary/border of the touch screen display 105, the partial region 610 in fact is intended to refer to that portion of the touch screen display 105 that is within that boundary, rather than the entire space defined by that boundary.

Further, it should be understood that the first partial region 610 does not constitute an actual displayed image item on the touch screen display 105 (such as a rectangular portion of the touch screen display that might be illuminated as such), but rather merely indicates a portion of the touch screen display that is capable of being actuated. Thus, in the present example, the touch screen display 105 is only being actuated to display image portions that happen to be positioned at locations (at pixel locations) on the display that are within the partial region 610, but is not being actuated to display any image portions that happen to be positioned at locations (at pixel locations) on the display that are within either of an upper region 612 above, or a lower region 614 below, the partial region 610 on the touch screen display 105. That said, to the extent that the image portions positioned within the partial region 610 (in this case, again, the icon 404, icons 406, and time display 408) are positioned within that partial region 610, the partial region 610 itself can be said to include those image portions. That is, for convenience of referencing the image portions that are within the partial region 610, one can refer to displaying of the partial region 610 itself as a manner of referring to the displaying of the image portions that happen to be physically located within the space corresponding to that partial region (again, in this case, the icons 404 and 406 and time display 408).

Still referring to FIG. 6, in the present embodiment, the partial region 610 (that is, the image portions positioned therewithin) is displayed at the first step 602 with maximum brightness (at a plateau). After a period during which the partial region 610 is displayed with the maximum brightness, the touch screen display 105 is actuated so that the brightness of the partial region 610 is decreased, until as illustrated in the second step 604 the displayed brightness level is reduced to a minimum. As will be discussed further in regard to FIG. 7, the transition between the maximum brightness level associated with the plateau and the minimum brightness level can occur over a specific amount of time. This operation in which the brightness level is reduced can be considered to be represented by an arrow 616 linking the first step 602 and the second step 604.

When the minimum brightness level is reached as represented by the second step 604, the partial region 610 (again, that is, the image portions contained therewithin) is still being displayed, because the touch screen display is still on (in accordance with intermediate mode operation as controlled by the sensor hub 223). However, the partial region 610 (that is, the image portions contained therewithin) are no longer visible to the user once the process reaches the second step 604 because the brightness level at which the partial region is being displayed is the minimum level. Even so, at this point, the touch sensing capability of the touch screen display 105 and particularly the touch sensing capability of the touch screen with respect to the hit areas (e.g., the icons 404 and 406) remains active. That is, generally speaking, the touch sensing capability of the touch screen display 105 during breathing operation remains active at all of the times during which the brightness level of the partial region 610 on the touch screen display is at a maximum, a minimum, or anywhere in between (e.g., during the time of transition between the first and second steps 602 and 604 as represented by the 616).

In contrast to the second step 604, at the third step 606 the touch screen display 105 is completely off and the image displayed at that point not only is entirely blank (e.g., such as the blank image 400 of FIG. 4A), but also the touch screen sensing capability of the touch screen display 105 is completely off. The transition from the second step 604 to the third step 606 is represented by an arrow 608, which indicates that, after reaching the completely blank but still technically-on status represented by the second step 604, the touch screen display and touch capability thereof are completely turned off. The amount of time in which the touch screen display 105 remains completely off at the third step 606 can vary depending upon the embodiment or circumstances. Throughout this time period, the electronic device 100 continues to be operating in the breathing mode, even though the touch screen display 105 is blank and non-responsive to user touches.

Ultimately, the off time corresponding to the third step 606 is completed and the touch screen display 105 and the touch capability thereof are turned back on, as a result of a transition represented by an arrow 620 leading to the fourth step 608. That is, upon completion of this transition, the process reaches the fourth step 608, at which the breathing view image and particularly the first partial region 610 (that is, the image portions contained therewithin) is again displayed with minimum brightness in the same manner as was the case at the second step 604. Thus, again in this example the touch screen display 105 at this step is blank, but that the touch capability of the touch screen display 105 within the partial region 610 is active. Following the fourth step 608, the process returns to the first step 602, at which breathing view image 402 and particularly the partial region 610 (that is, the image portions contained therewithin) are displayed with maximum intensity. The transition from the fourth step 608 at which the touch screen display 105 is at the minimum brightness level to the first step 602 at which the touch screen display is at the maximum brightness level is represented by an arrow 622 linking those steps. Upon reaching the step 602, the touch screen display 105 remains at the maximum brightness level, at the breathing plateau, for an additional amount of time that can be the same as when the step 602 was earlier performed or for a different amount of time, depending upon the embodiment or operational circumstance.

Figure 7:
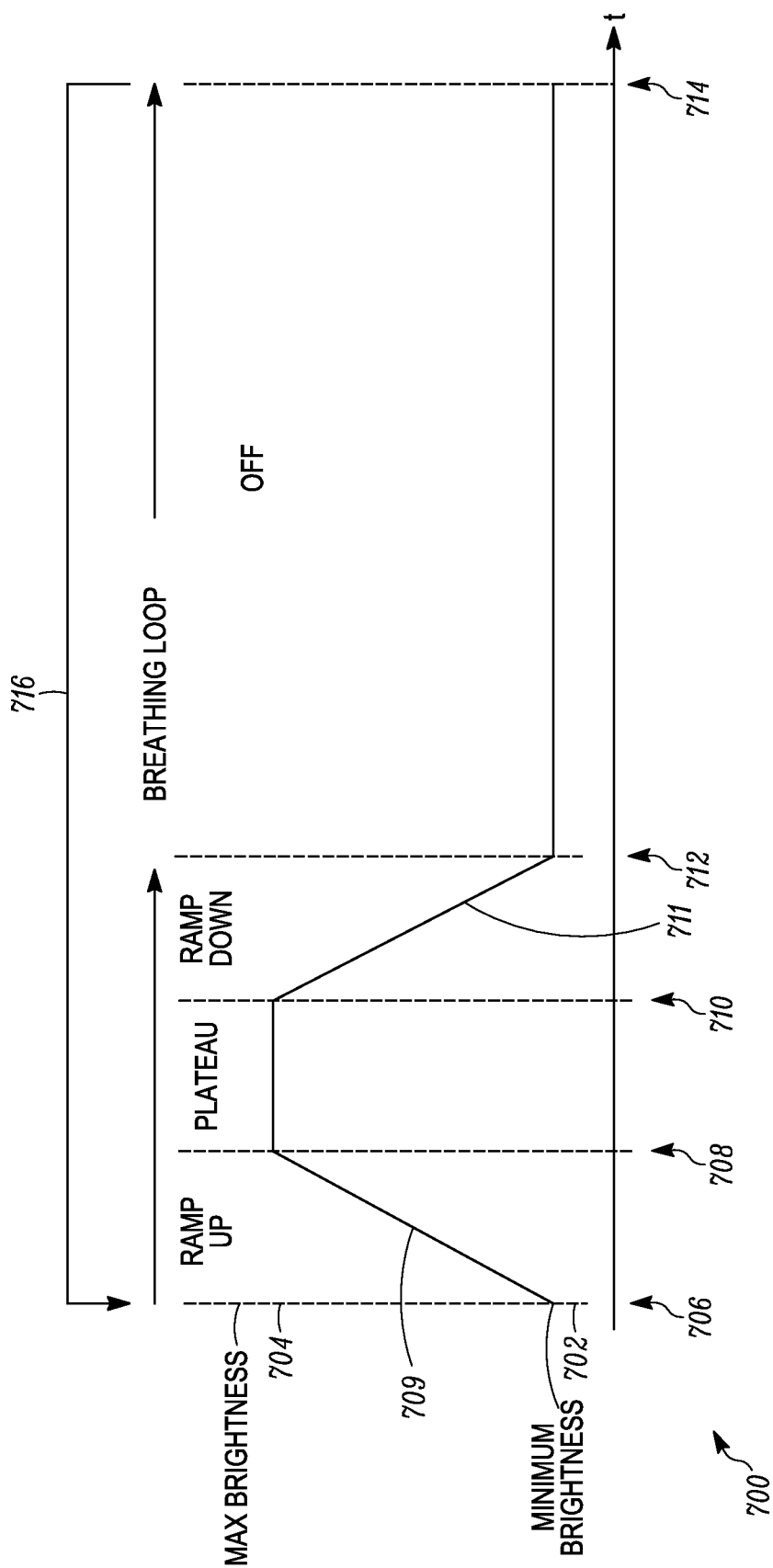
FIG. 7 a graph illustrating example variation in brightness of the display screen of the electronic device of FIGS. 1 and 2 during operation in the breathing mode portion of the example process of FIG. 3 as illustrated by FIG. 6.

It should also be appreciated that the exact manner in which the transitioning occurs among the different brightness levels corresponding to the steps 602, 604, 606, and 608 of operation in the breathing mode as shown in FIG. 6 can vary depending upon the embodiment or circumstance. Referring to FIG. 7 in particular, a timing graph 700 shows one example of how the on/off status and the brightness levels of the touch screen display 105, in terms of displaying image portions and particularly partial regions(s) in relation to which the touch screen display is configured to receive touches (e.g., the partial region 610), can vary with time. FIG. 7 particularly shows how the brightness levels of the touch screen display 105 vary with time between a minimum brightness level 702 and a maximum brightness level 704. More particularly as shown, in this example, the increase in brightness between the minimum brightness level 702 and the maximum brightness level 704 that occurs between the steps 608 and 602 of FIG. 6 (as represented by the arrow 622) is shown in FIG. 7 to occur, between a time 706 and a time 708, in a linear manner shown as a linear portion 709. However, in alternate embodiments, the ramping up can be in accordance with any linear, logarithmic, sinusoidal, or other type of manner.

Further as shown in FIG. 7, upon reaching the maximum brightness level at the time 708, the touch screen display 105 operates to display a breathing view image (for example, the breathing view image 402 of FIG. 4B including the first partial region 610) at the maximum brightness level until a later time, which in this example is a time 710. This period of time during which the touch screen display 105 is at its brightest level can be referred to as the "breathing plateau". In this regard, it should be appreciated that the amount of time at which the maximum brightness level is exhibited, that is, the difference in the times 710 and 708, can vary depending upon the embodiment, as well as the operational circumstance. For example, in some embodiments, the time of the plateau can be longer for breaths that are triggered by new notifications and/or device gestures than for other breaths. That is, further for example, the continually-repeating breaths performed at the step 326 can generally have plateaus of a consistent length but, in the event the process 300 involves a new notification in accordance with the arrow 333 and step 320 of FIG. 3, or some other type of event for which an elongated plateau is appropriate (e.g., as discussed in regard to FIGS. 9 and 10A-10B below), then the next breath performed at the step 326 can have a plateau of a longer time length.

Subsequent to the time 710, the brightness level of the touch screen display 105 is reduced back down again up until a time 712, at which the minimum brightness level is reached, an operation corresponding to the transition represented by the arrow 616 of FIG. 6 between the first (maximum brightness) step 602 and second (minimum brightness) step 604. This reduction in brightness is again shown in FIG. 7 to occur in a linear manner as represented by a linear portion 711. That said, the reduction in other embodiments can occur by way of a linear, logarithmic, sinusoidal, or other type of manner. Subsequently, after the minimum brightness level is reached at the time 712 corresponding to the step 604, instantaneously or almost instantaneously the touch screen display 105 then turns off in accordance with the step 606 (that is, the performing of the transition from the second step 604 to the third step 606 as represented by the arrow 618 of FIG. 6 can occur instantaneously or substantially instantaneously). Then, from the time 712 to a time 714, the touch screen display 105 is off and not displaying anything.

It should be appreciated that the display operations between the times 706 and 712, in which the breathing view image (e.g., the image 402 of FIG. 6) becomes brighter, then plateaus, and then becomes dimmer, can be considered a "breath" during breathing operation of the electronic device. Additionally, it should also be appreciated that the exact amount of time that the touch screen display 105 is off following such a breath can vary depending upon the embodiment or circumstance, and can vary during operation of the electronic device 100 over time. For example, in some embodiments, the off time will increase so as to "slow down" the breathing operation when it is detected that there is very little (or has been very little) activity of the electronic device.

Finally, in correspondence with the transition from the third (screen off) step 606 to the fourth (minimum brightness) step 608 of FIG. 6 as represented by the arrow 620, FIG. 7 includes an arrow 716 by which it is indicated that the off status of the touch screen display 105 is ultimately concluded and the process transitions again to a period of increasing brightness beginning again at the time 706 at which the touch screen display is on and at its minimum brightness level. It should be appreciated that, although the arrow 716 of the timing graph 700 of FIG. 7 shows the process as returning to the time 706, this should be understood merely as an indication that the breathing loop continues repetitively, and not that the operation returns to the exact same moment in time at which the operation first begin. That is, when the process repeats itself, it begins again at a time later than the time 714, or possibly at the time 714 itself, which would correspond to an understanding that the arrow 716 represents an instantaneous transition.

In view of FIGS. 6 and 7, it should be appreciated that the breathing mode of operation corresponding to the step 326 of the process 300 of FIG. 3 can involve a continual repetition of (cycling through of) the steps 602, 604, 606, and 608 (and transition steps in between represented by the arrows 616, 618, 620, and 622) over an indeterminate length of time. From the above, it will be appreciated that a number of particulars regarding these steps of the breathing mode, as well as an overall duty cycle for this mode, can vary depending upon the operational circumstance (e.g., the time length of the plateau or off period), and further that such particulars can also be varied depending upon the operational circumstance (e.g., a duty cycle of the breathing operation can be reduced when the electronic device is not being used). Nevertheless, as will be appreciated, the overall nature and ordering of these breathing steps remains the same as the breathing operation proceeds.

Thus, during operation in the breathing mode, a user experiences the electronic device as a device that substantially or largely appears to be "off" insofar as much of the time the touch screen display is blank, but that occasionally displays, in gradually-appearing and gradually-disappearing manner, image portions indicating that there may be items/notifications of interest for the user. That said, although this breathing mode of operation can continue on indefinitely, as already discussed in regard to FIG. 3 and as discussed further below, the electronic device 100 nevertheless can exit the breathing mode to another mode of operation, such as the peek view mode of operation or out of the intermediate mode to either the fully active mode or off mode, under any of a number of circumstances.

Turning now to FIGS. 8A and 8B, as already discussed to some extent in relation to FIGS. 4A-4D, 5A-5D, and 6, in the present embodiment during operation in the intermediate mode corresponding to the region 306 of FIG. 3, specific portions of the touch screen display 105 of the electronic device 100 (to the exclusion of other portions of the touch screen display) are actuated at particular times so as to display particular image portions and/or so as to be able to receive particular touch inputs. The specific portions of the touch screen display 105 that are actuated in this regard can depend upon the embodiment or operational circumstance. Nevertheless, in the present embodiment, all of the image portions corresponding to each of the different images are stored in a single frame buffer that determines all of the image portions available for display during operation in the intermediate mode.

For example, in regard to the image portions of FIGS. 4A-4D, as already discussed, display of the peak animation view 410 involves the display of different image portions (e.g., the icons 404 and 406, and time display 408) than those which are displayed in the peek view 414 (e.g., the animation portions 412, icons 405 and 407, and text string lines 416). Nevertheless, these different image portions are located in different regions of the touch screen display 105, and consequently all of these image portions can be stored as a full image in a single frame buffer 800 corresponding to an overall display screen view as shown in FIG. 8A. In this regard, the frame buffer 800 can further be considered to be a set of image portions/image information that is stored in the memory devices 205 of the electronic device 100 and that is utilized by the sensor hub 223 as it controls operation of the touch screen display during operation in the intermediate mode, including the breathing mode and the peek view mode respectively corresponding to the steps 326 and 336 of FIG. 3. It should be noted that the information stored in this regard can vary over time, for example, as new notifications arise (e.g., in which case one or more the text string lines 416 could change).

Referring further to FIG. 8B, given a frame buffer such as the frame buffer 800 shown in FIG. 8A, it should be appreciated that the touch screen display 105 can be controlled so as to display, and/or so as to be capable receiving touch inputs, specifically in relation to particular ones of the image portions in the frame buffer if the touch screen display is divided into different partial regions thereof that can be actuated independently. Actuation of partial regions of the touch screen display 105 (which can particularly entail, for example, actuation of certain ranges of rows of pixels or ranges of columns of pixels on the display), rather than the entire display, can be advantageous from the standpoint of saving power as well and reducing the chance that the display is actuated to too great an extent that damage could result.

In the example provided by FIG. 8B, a diagram 802 particularly shows how the touch screen display 105 can be divided into five partial image regions that respectively overlay and encompass specific image portions from the full image corresponding to the frame buffer (as illustrated by the frame buffer 800). As shown, FIG. 8B not only includes the first partial region 610 already discussed in relation to FIG. 6, but additionally includes a second partial region 804, a third partial region 806, partial region 808, and a fifth partial region 810, where in this example each of the successive partial regions 610, 804, 806, and 808 encompasses and extends beyond the preceding partial region, except for the fifth partial region 810, which encompasses different parts of the touch screen display other than those encompassed by the partial regions 610, 804, 806, and 808.

More particularly, as already discussed with respect to the first partial region 610 in relation to FIG. 6, that region encompasses and can be said to include the image portions of the breathing view 402 of FIG. 4B that is, the icons 404 and 406 and the time display 408. By contrast, the second partial region 804 encompasses everything encompassed within the first partial region 610 and additionally includes first portions of the animation features 412 shown in FIG. 4C, which in this example include a first (innermost) one of each of the columns of the dots above the time display 408 and below the icons 406, respectively. Further as shown, the third partial region 806 encompasses all of the image portions encompassed within the second partial region 804, and further encompasses the second (or middle) one of each of the columns of the dots encompassed within the animation features 412. Additionally as shown, the fourth partial region 808 encompasses all of the image portions encompassed with the third partial region 806, and further encompasses the third (or outermost) one of each of the columns of the dots encompassed within the animation features 412. Thus, the peek animation view 410 in FIG. 4C is a view in which the touch screen display is being actuated to display and potentially receive touch inputs at the fourth partial region 808.

As for the fifth partial region 810 of FIG. 8B, as already noted this partial region (unlike the partial regions 610, 804, 806 and 808) does not encompass any of the other partial regions but rather encompasses substantially all of the remaining sections of the touchscreen display 105 that are excluded from the fourth partial region 808. The fifth partial region 810 as shown particularly includes both a region above the fourth partial region 808 as well as a portion below the fourth partial region 808. The fifth partial region 810 particularly therefore is suited for encompassing the image portions corresponding to the peek view image 414 shown in FIG. 4D (and FIG. 5D), particularly, the icon 405 and the text string lines 416 in their position near the upper end of the touch screen display 105 as well as the icons 407 in their position proximate the bottom of the touch screen display.

Figure 9B:
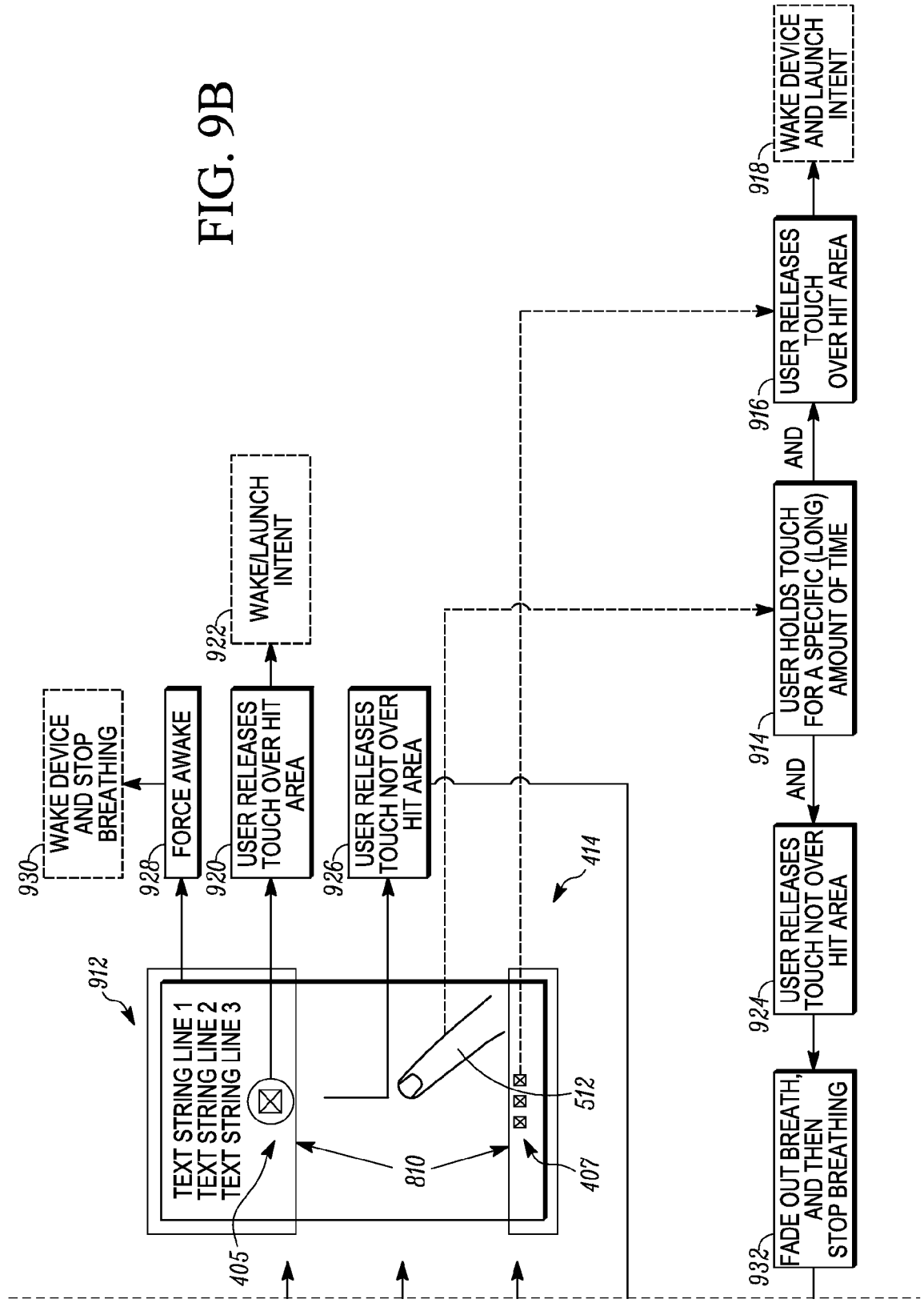
FIG. 9 (represented by FIGS. 9A and 9B) is a modified flow chart illustrating, partly by way of a series of additional example views of the display screen of the electronic device of FIGS. 1 and 2, operation of the electronic device as it transitions among the breathing mode portion of the process of FIG. 3 illustrated by FIG. 6, a non-breathing mode of that process, and a peek view mode of that process.

Turning next to FIG. 9 (represented by FIGS. 9A and 9B), an additional modified flow chart 900 is provided that illustrates, partly by way of a series of additional example views of the touch screen display 105 of the electronic device 100, example operation of the electronic device 100 as it transitions between the breathing and the peek view modes of operation, which together form the intermediate mode of operation encompassed by the intermediate region 306 of FIG. 3, as well as further transitioning between that intermediate mode and the non-breathing mode (off mode) corresponding to the region 304 of FIG. 3. The process represented by the flow chart 900 is shown to begin in either of two manners as indicated by first and second start indicators 902 and 940, respectively.

Upon beginning at the first start indicator 902, the process commences operation in the breathing mode at a step 904 corresponding to the step 326 of FIG. 3 as well as to the discussion above pertaining to FIG. 6. As indicated in FIG. 9 (represented by FIGS. 9A and 9B), the electronic device 100 is operating in the breathing mode particularly because (in accordance with the steps 320, 322, and 324 of FIG. 3) there have already been received one or more notifications and it has been determined that those notifications are appropriate to justify displaying breaths in accordance with operation in the breathing mode as described in relation to FIGS. 6 and 7. Accordingly, as an example, the step 904 includes a diagram 903 with the breathing view image 402 of FIG. 4B. Additionally, the diagram 903 shows the first partial region 610 since, in the present example, the touch screen display 105 is operated to display only the first partial region 610 (that is, image portions contained therewithin) and none of the partial regions 804, 806, 808, or 810 of FIG. 8B. It should be further appreciated that, although the flow chart 900 of FIG. 9 (represented by FIGS. 9A and 9B) concerns the transitioning from the breathing mode to the peek view mode, if no transition was to occur, then the breathing process would continue as discussed already in relation to FIG. 6 (until such time as another transition out of the breathing mode was appropriate in accordance with FIG. 3).

In addition to showing the breathing view image 402 (and partial region 610), the diagram 903 illustrating the step 904 of FIG. 9 further shows the user's finger 512 positioned in relation to a hit area included with that image (in this case, the icon 404), so as to illustrate a circumstance where the user is providing a touch input in response the displaying of a breath. It is such a touch input, provided at a hit area during a breath, in accordance with the step 334 of FIG. 3, that can trigger a transition from the breathing mode to the peek view mode. That is, in accordance with the breathing mode of operation, the touchscreen display 105 is not ready to receive user touches in relation to a hit area such as the icon 404 at times (such as at the step 606 in FIG. 6) when the breathing view image 402 is not being displayed, but rather is only receptive to touches when the breathing view image is present (e.g., between the times 706 and 712 illustrated in FIG. 7). At the step 904, it is presumed that the breathing view image 402 is being displayed and that the touch screen display 105 is being operated to be receptive to a touch by a user finger 512.

Upon the user touching the hit area at a time when the touching capability is active, the process of the flow chart 900 then advances from the step 904 to a step 906 as indicated by an arrow 905, and the step 906 is then subsequently followed in rapid succession by a step 908, a step 910 and a step 912. The steps 906, 908, and 910 particularly illustrate that, so long as the user continues to touch the hit area (e.g., the icon 404) continuously with the user's finger 512 as shown, then the touch screen display 105 transitions from displaying only the image portions contained in the first partial region 610 to the only the image portions contained in the second partial region 804 (such that innermost dots of the columns encompassed by the animation features 412 become visible), then to displaying only the image portions contained in the third partial region 806 (such that also the middle dots of the columns encompassed by the animation features become visible), and then to displaying all of the image portions contained in the fourth partial region 808 (such that all of the animation features become visible). That is, in succession, the first, second, and third partial regions 610, 804, and 806 are withdrawn and replaced by the second, third, and fourth partial regions 804, 806, and 808, respectively. In some circumstances, such process of displaying and withdrawal of partial screen information can be performed based upon, and/or varied (including variation in time) based upon, a variety of factors, for example, context, notification content, notification priority, or device state.

Finally, if the user has continued to touch the hit area (again, for example, the first icon 404) continuously throughout the steps 906, 908 and 910 all the way up to the beginning of the performing of the step 912, then at the step 912 the fifth partial region 810 is displayed. At this point, the image displayed by the touch screen display 105 switches from the peek animation image 410 of FIG. 4C to the peek view image 414 of FIG. 4D, and the electronic device 100 is now operating in the peek view mode corresponding to the step 336 of FIG. 3. It will be appreciated that the particular manner of displaying the animation features 412 the various steps 906, 908, and 910 particularly is intended to communicate (as a visual cue or hint) to the user that the user can further complete an actuation in the peek view mode by moving the user's finger from 512 from one of the icons 404, 406 to one of the icons 405, 407 shown in the peek view image 414. It also should be understood that, although the present discussion envisions that the user's finger 512 maintains continuously the touching of the hit area all of the time from the step 904 up to the step 912 so as to reach the peek view mode, in other embodiments such touching need not be entirely or substantially continuous.

Referring still to FIG. 9 (represented by FIGS. 9A and 9B), once the step 912 and peek view mode have been reached, any of a number of different results can occur depending upon how the user interacts with the touch screen display 105 while in the peek view mode. In the present embodiment, interaction with the touch screen display 105 in the peek view mode depends upon the user's gestural behavior in view of the differences between the peek view image 414 and the breathing view image 402 (and peek animation image 410) in terms of the placement of the "hit areas". In particular, in the present example embodiment, although the icons 404, 406 are considered to be the touchable hit areas while the electronic device 100 is operating in the breathing mode (for example, at the step 904), at the step 912 the hit areas change so as to encompass each of the icons 405 and 407 that are now positioned toward the upper and lower ends of the touch screen display 105 in the peek view image 414. That said, in the present embodiment, the user's manipulation of the user's finger 512 in relation to the icons 405 and 407 of the peek view image 512 determine going-forward operation.

More particularly, in this embodiment in which the relocated hit areas are the icons 405 and 407, user gestures by moving the user's finger 512 produce the following results in peek view mode. First, as indicated at the step 912 by a sub-step 914 and a sub-step 916, if the user holds their touch for a specific ("long") amount of time (e.g., all of the time between the step 902 and the step 912) and then, upon reaching the peek view mode at the step 912, slides the finger 512 so as to reach the icons 407 and then further removes the finger from the touch screen display after doing so, then the process advances to a step 918. This results in awakening of the electronic device 100, turning on of the processors 203, and launching of an intent corresponding to the icons 407 (e.g., launching of an application). Thus, by virtue of the user selecting the icons (or one or more of those icons) 407, the electronic device 100 proceeds from the peek view mode within the intermediate mode to the fully awake mode.

Similarly, as further illustrated by the sub-step 914 and a sub-step 920, if the user holds their touch for a specific ("long") amount of time and ultimately releases their touch after sliding the finger 512 to the hit area corresponding to the icon 405 proximate the top of the touch screen display 105, then a step 922 is performed at which the electronic device 100 switches from the intermediate mode to the fully awake mode and an intent corresponding to the icon 405 is launched. Thus, both with respect to the peek view mode operation resulting in the performing of the step 918 and the peek view mode operation resulting in the performing of the step 922, the actuation involves a sliding gesture portion corresponding to the arrows 515 already discussed with respect to FIG. 5D, where the user's finger 512 is manipulated so as to move from an original location corresponding to a breathing mode hit area (e.g., the icons 404, 406) to a peek view mode hit area (e.g., the icons 405, 407).

It should be noted that, in the present example embodiment, in order to achieve the launching of an intent at either of the steps 918 or 922, the touch contact between the user's finger 512 and the touch screen display 105 must remain constant and continuous throughout the peek view mode of operation, as the user's finger is moved from the location of the initial (breathing mode) hit area corresponding to one of the icons 404, 406 to the final (peek view mode) hit area corresponding to one or more of the icons 405, 407. Indeed, in the present embodiment, it is envisioned that, to achieve the launching of an intent at either of the steps 918 or 922, the user's finger needs to have been in constant and continuous contact with the touch screen display 105 all of the time between the step 904, at which the transition from breathing mode to peek view mode began, and the time at which the releasing of the appropriate hit area occurs in the peek view mode at either of the steps 916 or 920. Yet such operation is merely one example type of gestures intended to be encompassed herein, and the present disclosure is intended to encompass other types of gestures that do not entail such uninterrupted, continuous contact between the user's finger 512 and the touch screen display 512.

Further, in at least some embodiments, the launching of an intent at steps such as the steps 918 and 922 is accompanied by haptic or other types of feedback, such as a buzzing/vibration of the phone, to alert the user that the intent has been launched. Additionally, in at least some embodiments, the launching of the intent at the respective steps 918 or 922 cannot proceed unless, subsequent to the corresponding user release steps (the steps 916 or 920, respectively), an unlocking operation is performed at the electronic device. Such an unlocking operation can involve receiving a further touch input from the user (e.g., touching of one of the image portions of the peek view screen 414 or another image portion) signifying that the user wishes to unlock the device, so that further actions such as the launching of the intent can occur. It should be appreciated that, although such unlocking operation can be performed in regards to the steps 918 and 920, it is further intended that the present disclosure encompass additional embodiments in which unlocking or locking steps are performed at other times, such as in relation to one or more other steps of the processes described in relation to FIGS. 3-10B herein.

In addition to the above manners of operation, additionally as shown with respect to the step 912, several other results can occur rather than the launching of intents at the steps 918 and 922 if the user's finger 512 is not moved to (and released from) one of the hit areas of the peek view image 414 as discussed above but rather one or more other events occur. First, as indicated by a sub-step 928, in some circumstances even after the peek view mode has been reached (e.g., because the user's finger 512 has held the appropriate touch from the step 904 up to the step 912) the electronic device 100 can be forced to awake for some reason, for example, due to a power button press as discussed above in relation to the step 330 (in some cases, such a power button press can be an elongated press, such as a 5-second button press, which among other things can reset a newness counter). If this occurs, then the process advances from the sub-step 928 of the peek view mode again to the fully active mode as shown at a sub-step 930, at which the electronic device 100 is awakened and breathing mode operation is ceased.

Further, additionally in some circumstances even after the peek view mode has been reached (again, e.g., because the user holds the touch for the specific amount of time as indicated by the sub-step 914, from the step 904 to the beginning of the step 912), the user's finger 512 can leave the touch screen display 105 at a location that does not correspond to one of the hit areas in the peek view image 414 (that is, at a location not corresponding to any of the icons 405, 407). Depending upon the location at which the user releases the touch in this manner, then the sub-step 914 proceeds to either a sub-step 924 or a sub-step 926 as shown. More particularly, if the user releases the touch at a location corresponding to the sub-step 926, then the process returns back to the breathing mode as indicated by an arrow 927 leading from the step 912 (and sub-step 926) back to the step 904.

Further, if the user releases the touch at a location not over the hit area as indicated by a sub-step 924, it is also possible for the process to advance to a step 932, at which breathing mode (and peek view mode) operation is stopped and the most image displayed on the touch screen display associated with breathing mode/peek view mode operation is faded out (e.g., the peek view image 414 is faded out). Upon the step 932 being performed then the process further advances to a step 934, at which the dimensions of the partial region 610 are reduced so as to exclude notification content (in effect, the partial region 610 is replaced by a different partial region smaller than the partial region 610, which is not shown in FIG. 8B).

Additionally, the process subsequently advances to a step 936, at which a user can initiate a new breath as a result of a device gesture 936. Finally, upon such a gesture being received at the step 936, then the process advances to a step 938, at which the electronic device 100 enters an additional, special mode that can be referred to as a clock-only mode. As shown, in the clock-only mode, a gesture initiated peek view image 939 is displayed on the touch screen display 105. In such a view, the touch screen display 105 only displays a further-reduced partial region 940 (mentioned already in relation to the step 934) that has dimensions particularly suited for displaying only the time display 408. Such operation can also be considered to be a "privacy mode", since less information/device is shown than is shown in other images such as the breathing view image 402 and peek view image 414. Also, it should be noted that such operation can be reached upon locking of the electronic device and, the content/information regarding notifications in some such embodiments can only be viewed upon unlocking of the electronic device.

Although not shown in FIG. 9 (represented by FIGS. 9A and 9B), it should be appreciated that, upon reaching the clock-only mode corresponding to the step 938, it is possible for the electronic device 100 to return to at least one of the other modes such as the fully awake mode, intermediate mode, or off mode, in various manners. For example, the fully awake mode can be reached in one embodiment if a power button press such as that shown in the step 330 occurs. Additionally, it should further be noticed from FIG. 9 that, in the present embodiment, the electronic device 100 can reach the clock-only mode directly from the off mode rather than from the intermediate mode. More particularly as shown, upon beginning operation at the off mode as indicated by a start indicator 940, the process can begin at a step 942 at which the electronic device 100 is not breathing and the display screen is off, because there are no known notifications that need to be breathed. Notwithstanding this to be the case, the process can further advance from the step 942 to the step 936 in the event that the user initiates a new breath as a result of a device gesture, as discussed above. When this occurs, as already discussed above, the process again can reach the clock-only mode of the step 938.

Figure 10A:
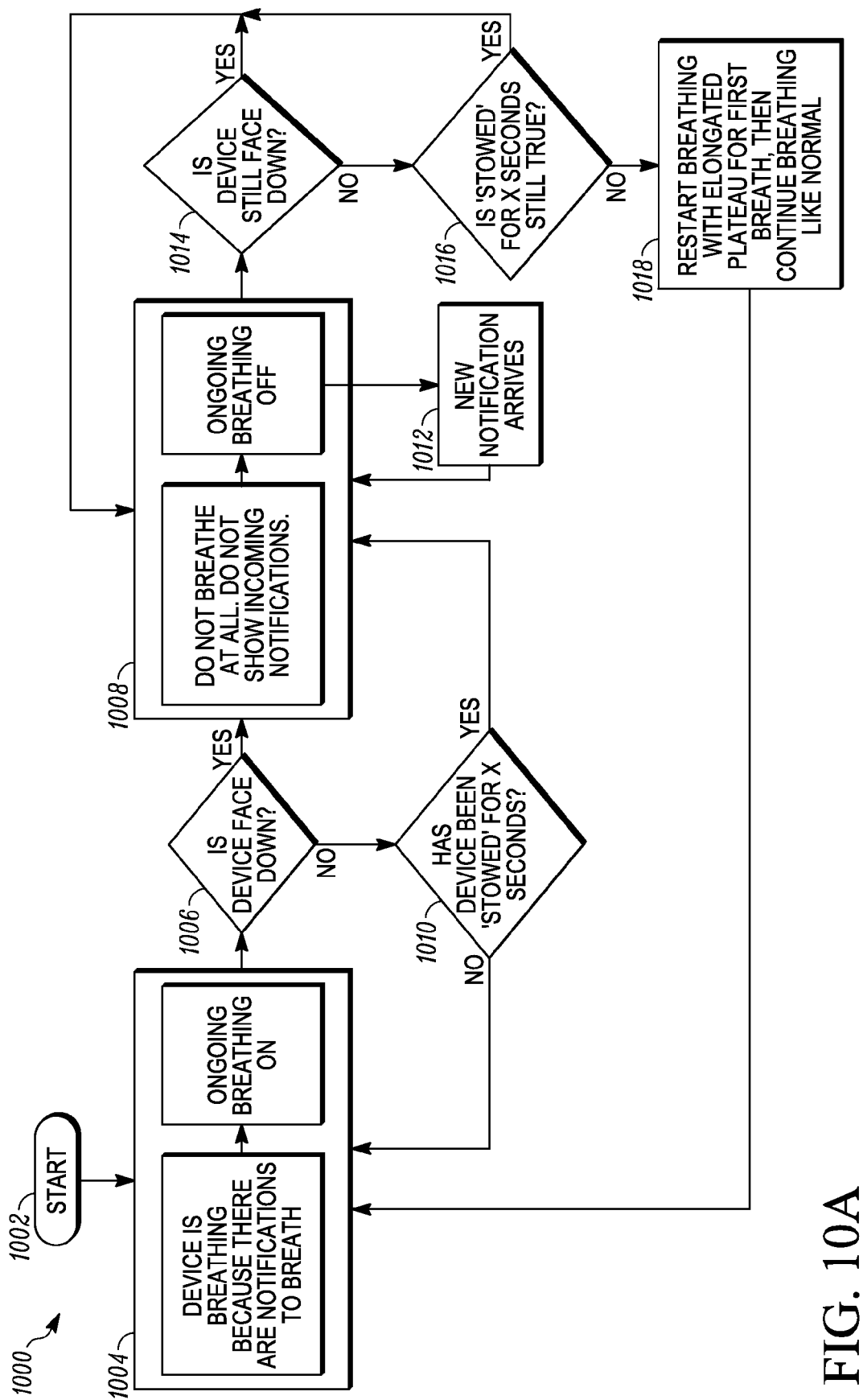
FIGS. 10A and 10B are additional flow charts showing further example subprocesses that can be performed by the electronic device of FIGS. 1 and 2, which can be considered to be encompassed generally by the example process of FIG. 3.
Figure 10B:
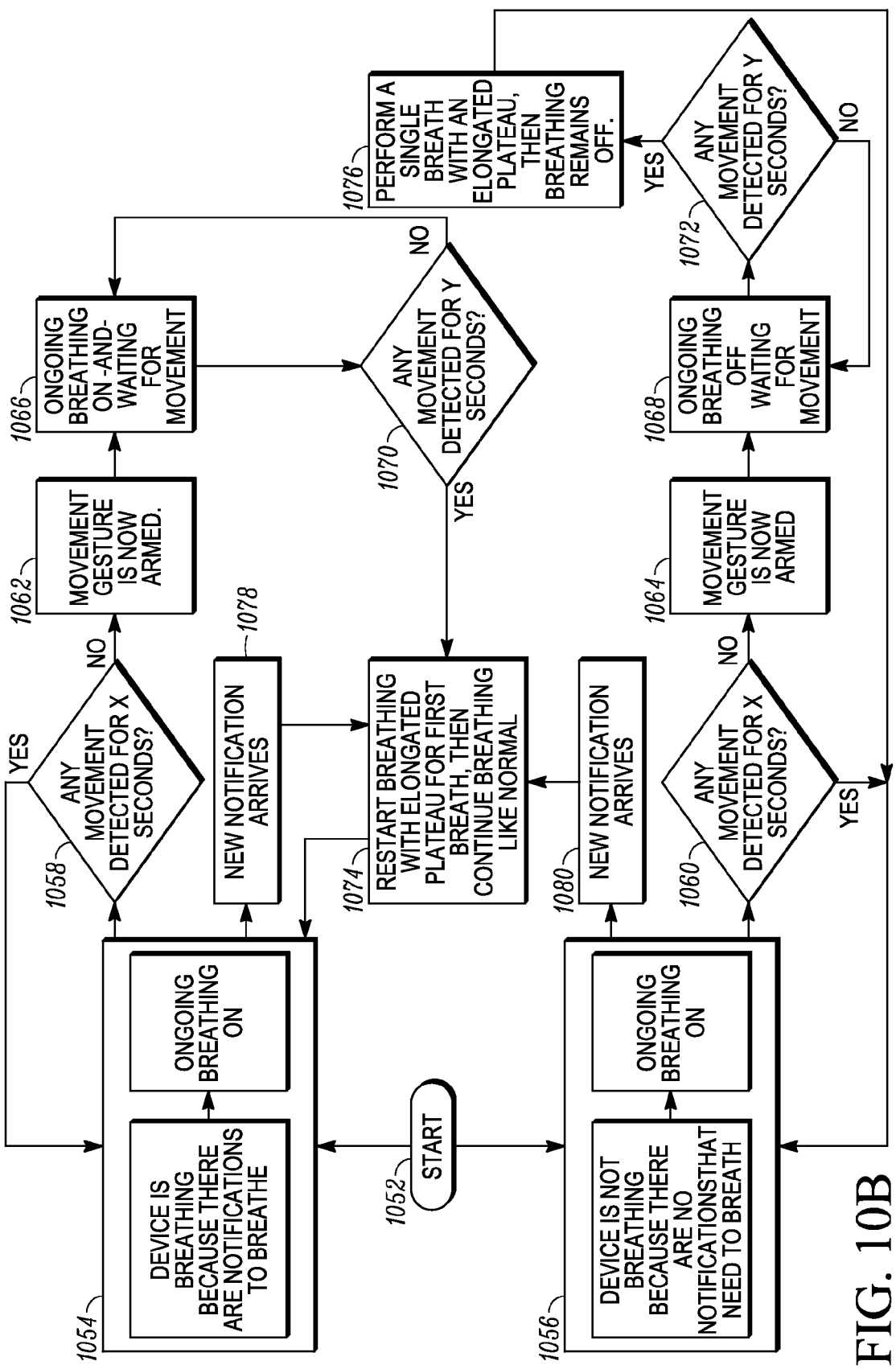

Now turning to FIGS. 10A and 10B, further flow charts 1000 and 1050 are provided that show additional example subprocesses that can be performed by the electronic device 100 of FIGS. 1 and 2, which can be considered to be encompassed generally by the example process represented by the flow chart 300 of FIG. 3. The flow chart 1000 of FIG. 10A shows example additional steps of operation in which the electronic device 100 transitions between the breathing mode corresponding to the step 326 of FIG. 3 and the off mode of the region 304 of FIG. 3. The flow chart 1050 of FIG. 10B further shows example additional steps of operation in which breathing operation of the electronic device 100 in the breathing mode varies in response to gestures that are sensed by the electronic device, as well as further steps of operation in which particular breathing operation can be triggered by a gesture even when the electronic device 100 is otherwise in the off mode.

More particularly, the subprocess represented by the flow chart 1000 of FIG. 10A begins, as indicated by a start indicator 1002, at a step 1004, at which the electronic device is operating in the breathing mode because there are one or more notifications suitable for being breathed. Then, as indicated by a step 1006, at some point the user can place the electronic device 100 into a face-down position. The electronic device 100 by virtue of one or more of its sensors 228 can detect such positioning and, if the electronic device determines that it is in a face-down position in accordance with a step 1006, then the process advances from the step 1004 via the step 1006 to a step 1008, at which breathing becomes stopped and there is no displaying at all of any incoming notifications by way of the breathing mode process.

Further as shown, even if the electronic device 100 is not positioned in a face-down manner as determined at the step 1006, then the electronic device 100 can further determine, as represented by a step 1010, whether the electronic device has been "stowed" for a certain predetermined amount of time (e.g., for X seconds). Depending upon the embodiment, when the electronic device 100 is "stowed" can depend upon a variety of possible environmental or operational circumstances, and can be determined upon a variety of input signals provided the sensors 228, including for example sensor input signals indicating that the electronic device is within a confined region such as a user pocket, a user purse, or a drawer of a desk. If at the step 1010 it is determined that the electronic device 100 has been stowed for a predetermined amount of time, then the process again advances to the step 1008, at which breathing operation is shut down. Alternatively, if it is determined at the step 1010 that the device has not been stowed for the predetermined amount of time, then the process returns to the step 1004 in which breathing operation continues.

Additionally as shown, upon the process reaching the step 1008 in FIG. 10A, the electronic device 100 operates in an off mode during which no notification messages of any kind are communicated to the user. That is, as illustrated by a step 1012, even if new notifications arrive during this off mode when the breathing is shut down, the receipt of such new notifications neither results in the display of any notification messages, nor causes the breathing operation to begin again. Rather, even when such new notification messages arrive, the process still returns to the step 1008 at which breathing operation is shut down.

Although breathing operation does not commence upon the receipt of any new notifications when the breathing operation is shut down at the step 1008, the breathing operation can begin again if one or the other of the conditions that gave rise to the shutting off of the breathing operation no longer remain(s) true. That is, if as represented by a step 1014, the electronic device 100 while in the off mode of the step 1008 continues to determine that the electronic device is face down, the electronic device then remains in the off mode of the step 1008. However, if the electronic device is not face down any longer as determined at the step 1014, then the process advances to a step 1016, at which it is further determined whether it is true that the electronic device has been stowed for the predetermined threshold (again, e.g., X seconds). If it is still true that the device has been stowed for the predetermined threshold of time, then the process continues to remain in the off mode of the step 1008. However, if at the step 1016 it is determined that the electronic device has not been stowed for the predetermined threshold of time any longer, then the process advances from the step 1016 to the step 1018, at which breathing operation is restarted and the process then returns to the step 1004.

As indicated by the step 1018, the restarting of the breathing at this juncture can be performed in a particular manner in which there is an elongated initial plateau (elongated period of time at which there is maximum intensity) for the first breath, after which normal breathing operation proceeds. It should be appreciated that the subprocess of FIG. 10A in which the face up/face down and stowing conditions are taken into account in relation to the breathing operation is particularly advantageous in that, by stopping breathing when the device is stowed or face down, the chance of inadvertent triggering of the phone (e.g., falsing) can be reduced. Although not shown in FIG. 10A, it should be appreciated that other conditions can also trigger breathing operation to be shut down. For example, in at least some embodiments, the electronic device 100 can consider whether the current time is within a range corresponding to night-time/sleeping (e.g., 11 PM to 6 AM) and, if so, can automatically shut off the breathing operation when the beginning of that range occurs and automatically turn the breathing operation back on when the end of that range is reached. Such operation can be referred to as "sleep mode" operation.

As for the subprocess shown in the additional flow chart 1050 of FIG. 10B, as shown that subprocess can begin, as represented by a start indicator 1052, either with a step 1054 or a step 1056, where the step 1054 constitutes ongoing operation of the electronic device 100 in the breathing mode that is occurring because there are notifications to breathe, and where the step 1056 constitutes operation of the electronic device in the off mode, during which the device is not breathing because there are no notifications that need to breathe. With respect to the step 1054 in particular, it should be appreciated that this step is identical to or can be considered to be identical to the step 1004 shown in FIG. 10A. That said, although not shown, it should therefore be understood that the particular process steps occurring in the FIG. 10B beginning with the step 1054 could equally proceed from the step 1004 of FIG. 10A (and also that the particular process steps of the FIG. 10A could flow from the step 1054 as well).

Further with respect to FIG. 10B, regardless of whether the subprocess begins with the step 1054 or 1056, the subprocess can proceed from either of these steps based upon a determination by the electronic device 100 as to whether any movement of the electronic device has been detected (e.g., by the sensors 228) for a predetermined amount of time. If, as indicated by a step 1058 following the step 1054, it is determined by the electronic device 100 that there has been movement detected within a predetermined amount of time (e.g., within the past X seconds), then the process continues to remain in the breathing mode and continues to cycle back from the step 1058 to the step 1054. Likewise, if at a step 1060 following the step 1056 it is determined by the electronic device 100 that there has been movement detected within the predetermined amount of time (e.g., within the past X seconds), then the process returns to and continues to cycle back to the step 1056 and remains in the off mode where breathing is not occurring.

Alternatively, if at either of the steps 1058 or 1060 it is determined that movement that the electronic device 100 has not been moved for a particular amount of time, then the process instead advances from the step 1058 to a step 1062 or from the step 1060 to a step 1064, respectively. At each of the steps 1062 and 1064, the electronic device 100 becomes ready to receive a movement gesture, that is, a movement gesture is now armed. Notwithstanding the arming that occurs at the steps 1062 and 1064, otherwise subsequent to these steps the electronic device 100 remains in the same state regarding breathing operation. That is, as illustrated, the process advances from the step 1062 to a step 1066 at which ongoing breathing operation continues and in which the electronic device 100 is waiting for additional movement (the movement gesture). Likewise, upon the step 1064 being performed, then that step is followed by a step 1068 at which breathing operation remains off and the electronic device is waiting for additional movement.

Subsequent to the steps 1066 and 1068, respectively, as indicated by a step 1070 and a step 1072, respectively, the electronic device 100 then determines whether any movement has now occurred for a new predetermined threshold (length amount) of time (e.g. for Y seconds), for example, by way of sensing performed by the sensors 228 (e.g., an accelerometer or GPS device). In the present embodiment, the electronic device 100 is configured to consider any detected movement as satisfying the steps 1070, 1072 (even, for example, only a nudge or micromotion) albeit, in other embodiments, the electronic device 100 is configured so that only the detection of a movement of a particular type, extent, or magnitude will satisfy one or both of the steps 1070, 1072. Additionally, although the new predetermined threshold of time is shown in the steps 1070, 1072 to be different than that of the steps 1058 and 1060, this need not be the case. Indeed, any and all of the time thresholds discussed herein can be varied depending upon the embodiment or circumstance.

That said, if no movement has been detected over the new predetermined threshold of time in the case of the step 1070, then the process returns to the step 1066 in which ongoing breathing operation continues and the electronic device continues to wait for a movement, and if no movement is detected over the new predetermined threshold at the step 1072, then that step returns to the step 1068 at which the breathing operation remains shut off and the electronic device continues to wait for a movement.

Alternatively, if movement is detected within the new predetermined threshold of time at the step 1070, then in that case the process advances from the step 1072 to a 1074, at which breathing operation is continued but is restarted in a manner where there is an elongated plateau for the first breath. That is, the time period of the breathing plateau at which the first breath is displayed with maximum intensity lengthened relative to a normal length of the plateau. After the performing of the step 1074, the process then returns to the step 1054, and breathing operation continues on as normal. Further, if movement is detected within the new predetermined threshold at the step 1072, then the process advances from the step 1072 to a step 1076, at which the electronic device 100 causes the touch screen display 105 to display a single breath within an elongated plateau and then, following the display of that single breath, then the electronic device returns to the step 1056 at which breathing operation is shut off.

Finally, also as shown in FIG. 10B, it should be noted that the portions of the subprocess of the flow chart 1050 involving both ongoing breathing operation and operation during which breathing is shut off are linked insofar as, in each case, if a new notification arrives, then breathing can be restarted. More particularly in this regard, upon a new notification arriving when the device is in the breathing mode at the step 1054, then as indicated by a step 1078 the process proceeds to a step 1074, at which the breathing is restarted but with an elongated plateau for the first breath, after which the process returns to the step 1054. Likewise, upon a new notification arriving when the device is not breathing as indicated by the step 1056, then as indicated by a step 1080 the process also proceeds to the step 1074, at which the breathing is restarted (with an elongated plateau for the first breath), after which the process also proceeds to the step 1054 in which breathing continues.

From the above discussion and description, it should be appreciated that the present disclosure encompasses numerous features and manners of operation, including among other things numerous features and manners of operation relating to the receipt and display of notifications. It is intended that the present disclosure encompass not only the particular embodiments described above, but also numerous other variations of those embodiments. Among other things, in at least some embodiments, the color of touch screen display 105 (of the user interface screen), or portions or aspects thereof, such as a backplate or wall paper color, can be varied. This can impact numerous aspects of operation, such as for example the color of the clock in the time display 812. Also for example, if notifications are to be prioritized in some manner or certain notifications are of high priority for a particular reason (e.g., because the notifications come from particular persons who are identified as favorites in the user's contact list), then those notifications or portions thereof (e.g., the name of the person indicated in the notification) can be displayed or highlighted in a particular color or colors.

Among other things, at least some embodiments encompassed herein include functionality in which the processors (e.g., application processors) of the electronic device are awake and awakened in some circumstances by the receipt of new notifications. When awake, the electronic device can turn on the display screen to display such a notification or to provide a full-screen alert about such a notification that remains on screen for a pre-defined amount of time. Further, in some such embodiments, once the pre-defined amount of time has elapsed, the display turns off and sensor hub regains control of the display. When under the control of the sensor hub, a partial region of the display may turn on and off at specific times, a process that can be referred to as breathing operation. Breathing patterns can vary over time and based on context, notification content, notification priority, or device state.

Further, in at least some embodiments, even though the electronic device is under the control of the sensor hub (in a low-power mode of operation such as the breathing mode), a wake event can be detected that will cause the processors (application processors) to awaken. Such triggering events can include the receiving of any of many inputs, including but not limited to: a button press, an on-screen touch event or gesture. Further, in at least some embodiments, upon awakening, the electronic device can cause a special "Landing Screen" or other default screen to be displayed on the touch screen display, which can be a single point of entry upon waking of the device. From the Landing Screen, the user can take actions on individual notifications, individual applications, or perform a general unlock request.

Additionally, in at least some embodiments when such a Landing Screen (or other default screen) appears, as well as when subsequent screens appear in response to user inputs (e.g., user touching of a user interface element with the user's finger or a stylus), a consistent method of interaction can be employed. For example, in some embodiments, when a user touches on an icon from within the Landing Screen, this will result in multiple hit areas appearing, and unnecessary user interface elements will also disappear. Also, in some embodiments, the user must retain continuous touch on the display to remain in a given mode. If the user removes the user's finger from the touch screen display before reaching a hit area, the given mode is exited. Also, in at least some embodiments, as long as the touch input remains distant from the hit target, the user interface elements surrounding the hit target should have no opacity (and thus there will be no visible surrounding user elements).

Further, in at least some embodiments, as the touch input approaches a hit target, the user interface elements surrounding the hit target that is being approached should increase in opacity and/or increase in size and/or increase in quantity and, just before the touch input reaches the hit target, the area surrounding the hit target should have increased to full opacity and/or full size and/or full quantity. Additionally, in at least some such embodiments, once the touch input reaches the hit target, the hit target can be displayed with a highlight, indicating that the hit target has been reached. Further, upon the user's releasing of the touch while within the hit area, the resulting action should including performing of the action associated with the hit area (for example, exiting of a locked screen, opening of a specific application, or the taking of a specific action associated with a particular notification).

Additionally, in at least some embodiments, if the touch input is not released while within (or at or sufficiently proximate to) a hit target, but instead is moved away from the hit target, the hit target should no longer be highlighted, and the area surrounding the hit target should decrease in opacity as the touch input moves further away from the hit target. Further, if the touch input is released when a hit target is not reached, the interface should return to displaying the Landing Screen or other default screen. It should be noted that, with respect to the hit areas, in at least some embodiments these can take any of a variety of forms and, in at least some embodiments, these are larger than the visible icons.

Further, in at least some embodiments, incoming notifications (or incoming alerts) are prioritized according to various factors, including (but not limited to) context, user preference, learned behaviors, number of notifications, type of notifications, device state, and source of notification. Additionally, in some embodiments, a particular incoming alert or notification should be displayed only if it has met the criteria as determined by the prioritization rules. By virtue of such prioritization, only the most relevant notifications can be shown.

Also, in some embodiments, an Incoming Alert screen can be provided having certain (e.g., limited) functionality, in order to allow the user to take action on notifications as soon as the notifications are displayed. In such embodiments, if user touches on the Incoming Alert screen with the intention to act on the notification, but then releases touch without reaching a hit target, the interface will return to a default screen such as the Landing Screen.

Further, in at least some embodiments, the electronic device is capable of any of a variety of states, modes, or levels of operation. In some embodiments, there are three (3) levels (or three primary or core levels) of interaction between user and device, namely: (1) an active level or mode during which the user is in possession of device, and is regularly using it or looking at the screen often; (2) a nearby level or mode during which the electronic device is near the user, but determines it is not the primary method of interaction (with the user) at a particular time; and (3) an asleep level or mode that arises as a result of the electronic device determining that the user is sleeping. In some such embodiments, each of the levels of interaction will result in different breathing patterns and display brightness. For example, in one example embodiment, operation in the active level is such that, during a breathing cycle, the display may remain on longer (and off shorter) in order to ensure the user notices the breathing state as often as possible. Also, in such an embodiment, during operation in the nearby level, the breathing cycle will be longer than during operation in the active level, but the display will remain off longer. Further, in such an embodiment, during operation in the asleep level, the breathing cycle will be very minimal (and can be disabled entirely), and display brightness will be very low (for example, ~10 nits), so the user is not bothered while trying to sleep. Further, in some such embodiments, display brightness during the breathing states can also be influenced by input from an ambient light sensor.

Further, in at least some embodiments, there are several device states that can trigger different experiences. For example, if the electronic device is face down on a flat surface, this can trigger disabling of the breathing and incoming alert screen until this state is no longer active. Also for example, if the electronic device is stowed (e.g., within a pocket, backpack, etc.), this can trigger disabling of the breathing and incoming alert screen until this state is no longer active.

Further for example, if the electronic device is face up on a flat surface, the electronic device in this state can generally behave as normal, but can further start a timer to trigger a "Nudge" (e.g., a message to the user to take some action) at a future time. And, upon a Nudge occurring (while face up on flat surface), this can result in waking of the device or resetting of the breathing pattern.

The present disclosure further encompasses numerous different manners of operation in different types of breathing modes that are possible depending upon the embodiment and/or depending upon a variety of factors. In at least some embodiments, the electronic device is able, in response to a new alert, to transition to an Urgent Breathing State after a specific amount of time, and then to transition further to a Normal Breathing State after another specific amount of time. Also, in at least some embodiments, while the electronic device is in a breathing state, the device will wake up when user input is detected. Such user input can be detected through various methods, including (but not limited to), occurrences of a button press, an on-screen touch event, or gestures. In at least some embodiments, a user can touch on a user interface element associated with any notification to take action on the corresponding notification intents.

In at least some embodiments, notifications that are determined to be highly relevant are particularly exposed in the Urgent Breathing state, with the user interface displaying an indicator for which notification is highlighted in the Urgent Breathing Stage (in other embodiments, such an indicator need not be provided). When such indication is provided, a user can touch on the highly relevant notification (or any other notification) to take action on the corresponding notification intents. Over time, if a notification previously deemed highly relevant is determined to no longer be as highly relevant, the Urgent Breathing State can transition to a Normal Breathing State. In some embodiments, Highly Relevant information can also displayed on a default screen such as the Landing Screen.

In at least some additional embodiments, touch inputs can be received during an AoD (Always-on Display) mode, which can also entail a partial display mode and/or a breathing mode or state of operation. In some such embodiments, error detection and falsing prevention will help eliminate unintentional wakes. Further, if a touch input is detected during this mode, the device will wake up and, if an appropriate continuous touch input is detected arising from the breathing mode, the device will wake up and handle the touch event accordingly. In particular, if a continuous touch input is detected over a specific hit area, this will result in a cohesive experience from the "off" screen state or breathing mode all the way to the Landing Screen, and into the detail for whichever notification was selected by the user. Once this has occurred, the user will be able to act on the notification. This is all accomplished with a single touch from the user. In at least some further embodiments, there will be visual, haptic, and potentially auditory feedback to help communicate what is happening to the user. Also, in at least some embodiments user interface transitions between each of the various modes or states during a continuous touch will be smooth, responsive, and appear to be a single action.

Depending upon the embodiment, there are various types of content or information that can be shown during a breathing mode of operation, any of which can be shown alone or with additional content during the breathing mode. Some such example types of content can include: Dead Battery Charging (Sign of Life) Mode; Normal Charging Mode; Low Battery Warning Mode; Contextually-driven advertisements; map navigation information (such as that provided by Google Maps, available from Google, Inc. of Mountain View, Calif.); music controls; and contextual alerts and notifications.

Also, in at least some embodiments, while the electronic device display is (or application processors are) off, operation in the breathing mode can proceed during which an image is faded in and out on the display screen. Such display operation particularly can include attributes such as: a first attribute in which there is a delay at start of the breathing cycle (this delay can be, for example, 3000 ms in length, or any other value); a second attribute in which there is ramping up of the display over a period of time (for example, 1000 ms); a third attribute in which the display brightness is at a maximum value or plateau for an additional period of time (for example, 1000 ms); a fourth attribute in which the display brightness is ramped down over another period of time (again, for example, 1000 ms); and a fifth attribute in which the display is off for a further period of time (for example, 5000 ms). In terms of the maximum brightness occurring during the plateau, this can be set to any of a variety of values including, for example, a "100%" setting. The ramping up and ramping down can be linear, logarithmic, sinusoidal, in accordance with some other curve and/or some other type of functional relationship. Breathing state attributes can vary depending on context.

Additionally, in some embodiments, the electronic device provides a lock screen, and during display of this screen the user can touch on a user interface element associated with a specific notification to display actions and additional details and images associated with this notification. In some such embodiments, when the user touches on a user interface element associated with a notifications, two actions can be displayed, or alternatively more than two actions can be displayed, depending on the notification content and what contextually-relevant actions are available for that notification. In some such embodiments, at a minimum, one of the actions associated with notification should have the ability to dismiss the notification from the Landing Screen (or other default screen), Breathing State, and/or across the system. Further, when an action or intent is selected by the user, that particular action or intent will be taken, and the notification will be dismissed, it being understood that actions or intents can encompass or include (but are not limited to) any of a variety of application-requested actions, or new actions that are contextually relevant to the notification.

Further, in at least some such embodiments, if a lock method is in place (including but not limited to PIN, Password, Pattern, and Face Unlock), the lock method user interface will be displayed when the user takes action on a particular notification. Upon successfully unlocking, the intended action will be taken. If the action is not completed (because unlock was not successful), the associated notification will not be dismissed until acted upon or specifically dismissed from the Landing Screen (or other default screen). Also, the electronic device will be able to display notification details and images without requiring an unlock, in order to allow the user to view and dismiss such notification without unlocking first.

In at least some embodiments in which an application passes user-specific identifier(s) along with a notification, then additional contextual actions can be displayed within the user interface. This will allow additional actions that are contact-specific, rather than notification-specific (e.g., allow the user to respond to a Text Message with an Instant Message, or allow user to call the organizer of a meeting that is being shown on the screen).

In addition to the above discussion, in at least some embodiments, the present disclosure relates to a user interface that appears when an electronic device display is considered 'off' to the user (but still controlled by the sensor hub), as well as the user interface and functionality that supports it. In such embodiments, incoming notifications are normally displayed and also a breathing mode or state can be entered, in which limited notification information is displayed on an occasional, or periodic, basis.

In at least some embodiments, a lockscreen widget plays a role in implementing lockscreen behaviors and interactions. Such a lockscreen widget can take a variety forms, including smaller and larger widgets (that occupy smaller or larger portions of the display of the electronic device), which can appear for example in response to user swiping or from a breathing screen. In some such embodiments, the lockscreen widget particularly is an icon or displayed image portion that is reflective of information concerning one or more new notifications that have been received but have not yet been reviewed by a user (also, in some such embodiments, the lockscreen widget can show related information, such as an image of a third party by whom the notification was sent). In some such embodiments, the lockscreen widget is an item that can be selected (e.g., by way of a touch input) by a user to unlock the electronic device so as to allow for viewing of the notification. In some such embodiments an unlocking region is also displayed so that a user can confirm an action that was taken.

Further in at least some embodiments, breathing operation only occurs if one or more notifications of a certain priority level (e.g., a priority of zero or above) are present (have been received by the electronic device) and have not yet been seen by the user. If the user opens a lockscreen widget or a notification dropdown, breathing should be stopped (however, if a different sized lockscreen widget, e.g., a smaller widget, is being displayed, then breathing will not be stopped). Even after display of notifications, breathing can resume as soon as a new notification of appropriate priority (e.g., priority 0 or above) occurs.

In at least some further embodiments, breathing content can follow particular rules (not immediately after the incoming screen). First, a notification shown on a breathing screen should be filtered by newness, so that only new notifications (since the last breathing "stop") will be candidates for the breathing screen. Second, the notification shown on the breathing screen can be sorted first by score, and then by time, and the notification with the highest score can be shown on breathing screen. If multiple notifications have the same highest score, then those notifications can be further sorted by time, such that the highest scored, most recent notification is shown.

Further, in at least some embodiments, if breathing has been stopped, and a new notification comes in, the following will happen. First, the incoming screen is shown, and then after a time out breathing operation begins. Further, the breathing state should show any new notification that just arrived. If notifications occur before the user wakes the device and (if applicable) opens the a locking screen widget as described above or opens a notification dropdown, then the most recent highly rated notification should be shown. If the user wakes up the device, the notification that had been breathing should be the one that is shown on the locking screen widget. Further, if the widget that was shown on the breathing screen concerned a latter one of several notifications (e.g., 5th out of 7 notifications), then the locking widget should show the notification in the 5th position in order of all notifications (so clicking the previous button would go to the 4th notification, and clicking next would go to the 6th notification).

In at least some such embodiments, the notifications can be handled or prioritized in a variety of manners. For example, in some embodiments, the electronic device 100 can: ignore all notifications that are toggled ON in a blacklist; ignore all ongoing notifications; ignore all notification with a low or negative score (e.g., a score below 0); ignore all notifications that had occurred before the last time the user viewed a lockscreen widget; ignore all notifications that had occurred before the last time user showed curtain view.

Also, in some embodiments, various display features and rules for displaying features are provided. For example, a row of icons shown in the top of the screen can be the same as the icons shown in a status bar. Further, in some embodiments, when a notification clear occurs at background, the breathing view should be updated. Among other things, the row of icons at top of screen needs to be updated. Also, if the breathing notification is the one to remove, then the process can begin breathing the next one that meets the proper criteria for breathing. Further, in at least some embodiments, in accordance with an Incoming View, the electronic device operates to: ignore all ongoing notifications; ignore all notifications that are toggled ON in the blacklist; and/or ignore all notification with a low or negative score (e.g., a score below 0).

Additionally, with respect to lockscreen widgets, small or large widgets (e.g., 4×1 and 4×4 widgets, respectively) continue to reflect the order and content of the notification dropdown. Notifications will not be dismissed or hidden without the user specifically dismissing them. Further with respect to such widgets, in determining whether to display these, the electronic device can: ignore all ongoing notifications; ignore all notification with a low or negative score (e.g., a score below 0); and/or ignore all not notifications that are toggled ON in the blacklist. Additionally, it should be appreciated that some packages will be ignored by default, and thus pre-populated in a blacklist. In some embodiments, the user will be allowed to manually add/remove items from the blacklist via the user interface (e.g., via accessing settings options). Further with respect to Incoming Alerts, in at least some embodiments, a particular incoming alert or notification should be displayed only if it has met one or more criteria, such as those discussed above. The Incoming Alert screen can have limited functionality, in order to allow the user to take action on such notification as soon as it is displayed.

Further, at least some embodiments of the present disclosure envision that partial displays are output by the display screen of the electronic device. In some such embodiments, a particular notification should be shown on the partial display 'breathing' state only if it has met one or more criteria, such as those discussed above. The breathing state will have limited functionality, in order to eliminate falsing while still allowing lockscreen and widget functionality to be surfaced in this 'always on' state. While under control of the sensor hub, the electronic device can change the partial display regions or sequence of such regions that are being displayed, depending on user interaction (e.g., touch interactions or gestures). Display brightness during the breathing states will be influenced by Ambient Light Sensor input.

Depending upon the embodiment, several device states can trigger different experiences. For example, if the electronic device is face down on flat surface, then the electronic device will disable breathing and incoming alert screen until this state is no longer active. Also for example, if the electronic device is stowed (e.g., in a pocket, backpack, etc.), then the electronic device will disable breathing and incoming alert screen until this state is no longer active. Further for example, if the electronic device is no longer face down or stowed, then the breathing pattern can be restarted immediately. In some embodiments, touch input will be possible from the AoD (Always-On Display, and/or partial display and/or breathing modes). Further, in some embodiments, error detection and falsing prevention will help eliminate unintentional wakes. Additionally, in some embodiments, user interface transitions between each of various states during the continuous touch will be smooth, responsive, and appear to be a single action.

There are various types of content or information that can be shown in a breathing state. For example, the following types of content or information can be displayed alone or in combination with additional content: dead battery charging (sign of life) mode; normal charging mode; low battery warning mode; and/or contextual alerts and notifications. Also, while the device display is off and in the breathing state, breathing operation includes fading an image on the screen in and out. Depending upon the embodiment the electronic device can have any number of different breathing states that have various attributes, such as (for example): a first attribute at which there is a delay at the start of breathing cycle, which could be set to any value; a second attribute involving ramping up of the display brightness over a time period (for example, 1875 milliseconds (ms)); a third attribute at which the display is at a maximum brightness or plateau (for example, 250 ms), where the maximum brightness can take on any value depending upon the embodiment (for example, approximately 150 nits) and depend on ambient light as well; a fourth attribute involving ramping down of the display brightness over a time period (for example, 1875 ms), but could be set to any value; a fourth attribute at which the display is shut off (dark) over another time period (e.g., 7 seconds). These attributes can be repeated in a looping indefinitely. Also, the ramping up and down can be in accordance with linear, logarithmic, sinusoidal or other animation types, and breathing state attributes can vary depending on various factors, including (but not limited to) ambient light, gesture, and smart action triggers.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims. Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. An electronic device comprising:
   a receiver configured to receive notifications from a remote device;
   a display configured to provide information including notifications;
   at least one sensor configured to sense a movement of the electronic device;
   an application processor configured to control the display during a non-sleep mode of the electronic device, wherein the application processor consumes a first amount of power while providing the display with first instructions for displaying full screen information at the display, wherein the full screen information includes a first notification associated with information received by the electronic device during the non-sleep mode; and
   a sensor hub in communication with the at least one sensor and configured to control, independent of the application processor, the display during a sleep mode of the electronic device, wherein the sensor hub consumes a second amount of power that is less than the first amount of power while:
      providing the display with second instructions for displaying partial screen information at the display; and
      responsive to the at least one sensor detecting the movement of the electronic device, providing the display with third instructions for displaying the partial screen information in a modified manner by at least alternately displaying, and withdrawing from display, the partial screen information, wherein the partial screen information includes a second notification associated with information received by the electronic device during the sleep mode.

2. The electronic device of claim 1, wherein the electronic device is a mobile device, the receiver is a baseband processor configured to manage wireless communications, and the display is a touch screen display.

3. The electronic device of claim 1, wherein the full screen information includes data corresponding to substantially all pixels capable of being displayed by the display, and wherein the partial screen information includes data corresponding to less than substantially all pixels capable of being displayed by the display.

4. The electronic device of claim 1, wherein the sleep mode is associated with a substantially inactive mode of the application processor, and wherein the non-sleep mode is associated with a substantially active mode of the application processor.

5. The electronic device of claim 1, wherein sleep mode is associated with a low-power mode of the application processor, and wherein the non-sleep mode is associated with a normal power mode of the application processor.

6. The electronic device of claim 1, wherein the sensor hub is configured to cause actuation of the display, in response to the receiving of the second information, in which so that the second notification is displayed in a periodic manner in which a brightness level with which the second notification is displayed alternates between a high level and a low level.

7. The electronic device of claim 1, wherein the partial screen information is provided at, and withdrawn from, the display alternately, varying over time based on at least one of context, notification content, notification priority, or device state.

8. A method comprising:
   during a non-sleep mode of an electronic device, providing, by an application processor of the electronic device, to a display of the electronic device, first instructions for displaying full screen information at the display, wherein the application processor consumes a first amount of power while providing the display with the first instructions and the full screen information includes a first notification associated with first information received by the electronic device during the non-sleep mode; and
   during a sleep mode of the electronic device and while a sensor hub consumes a second amount of power that is less than the first amount of power:
   providing, by the sensor hub of the electronic device, to the display, second instructions for displaying partial screen information at the display, wherein the sensor hub is in communication with the at least one sensor of the electronic device, is configured to control, independent of the application processor, the display during the sleep mode of the electronic device, and the partial screen information includes a second notification associated with second information received by the electronic device during the sleep mode;

detecting, by at least one sensor of the electronic device, a movement of the electronic device; and responsive to the at least one sensor detecting the movement, providing, by the sensor hub, to the display, third instructions for displaying the partial screen information in a modified manner by at least alternately displaying, and withdrawing from display, the partial screen information.

9. The method of claim 8, wherein the first and second notifications are received from a remote device via wireless communication.

10. The method of claim 8, wherein the full screen information includes data corresponding to substantially all pixels capable of being displayed by the display, whereas the partial screen information includes data corresponding to less than substantially all pixels capable of being displayed by the display.

11. The method of claim 8, wherein sleep mode is associated with a substantially inactive mode of the application processor or with a low-power mode of the application processor, and wherein the non-sleep mode is associated with a substantially active mode of the application processor or a normal power mode of the application processor.

12. The method of claim 8, further comprising:
during the sleep mode of the electronic device, providing, by the sensor hub, to the display, based on at least one of context, notification content, notification priority, or device state, fourth instructions for alternately displaying, and withdrawing from display, the partial screen information.

13. The method of claim 8, wherein the display is a touch screen display, the method further comprising:
during the sleep mode of the electronic device:
receiving, by the sensor hub, an indication of a first touch input detected at the touch screen display at a location corresponding to a first image portion associated with the second notification;
providing, by the sensor hub, to the display, fourth instructions for adjusting the partial screen information so that altered partial screen information is displayed;
determining, by the sensor hub, that the first touch input has continued to be provided during the adjusting of the partial screen information;
detecting, by the sensor hub, a modification of the first touch input in relation to the touch screen display when the altered partial screen information is displayed; and
taking, by the sensor hub, an action based upon the detected modification of the first touch input.

14. The method of claim 13, wherein the received first touch input occurs when the electronic device is operating in breathing submode of the sleep mode, and the fourth instructions for adjusting the partial screen information are provided to the display when the electronic device is operating in a peek view submode of the sleep mode.

15. The method of claim 13, wherein the action is selected from the group consisting of launching an application, proceeding to a breathing submode of the sleep mode, returning to the non-sleep mode, and ceasing breathing operation so as to proceed to a further reduced display mode of operation.

16. A method comprising:
during a higher-power mode of operation of an electronic device during which at least one application processor of the electronic device controls a display of the electronic device while consuming a first amount of power:
receiving, by the at least one application processor, a first notification;
determining, by the at least one application processor, that the first notification satisfies at least one criterion for display in a low-power mode of operation; and
transitioning, by the at least one application processor, from the higher-power mode of operation to a lower-power mode of operation during which a sensor hub that is in communication with the at least one sensor of the electronic device, rather than the at least one application processor, controls, independent of the application processor, the display; and
during the lower-power mode of operation and while the sensor hub consumes a second amount of power that is less than the first amount of power:
providing, by the sensor hub, to the display, first instructions for displaying a first image portion identical to or based at least in part upon the first notification in a periodic manner in which at first times the displayed first image portion is displayed with at least one higher level of brightness and at second times the display first image portion is displayed with at least one lower level of brightness;
responsive to receiving, from at least one sensor of the electronic device, an indication of movement associated with the electronic device, providing, by the sensor hub, to the display, second instructions for displaying the first image portion in a modified manner by at least alternately displaying, and withdrawing from display, the first image portion;
receiving, by the sensor hub, a signal indicative of a user input corresponding to the first image portion; and
taking, by the sensor hub, at least one first action in response to receiving the signal.

17. The method of claim 16, wherein display is a touch screen display and the signal indicates a touching of a region on the display corresponding to the first image portion.

18. The method of claim 17, further comprising:
determining, by the sensor hub, that the touching occurs for at least a predetermined amount of time;
providing, by the sensor hub, to the display, third instructions for displaying a second image portion at a different location on the touch screen display than the first image portion; and
detecting, by the sensor hub, a modification of the touching in relation to the touch screen display indicating that the touching has been shifted to the different location at which is displayed the second image portion,
wherein the taking of the action based upon the detected modification of the first touch input includes launching an application.

19. The method of claim 18, wherein the first image portion is located within a first partial region associated with the touch screen display, wherein the second image portion is located within a second partial region associated with the touch screen display, and wherein the first instructions include initial instructions for initially actuating of first pixels of the touch screen display associated with the first partial region at a first time to the exclusion of second pixels of the touch screen display associated with the second partial region, and the third instructions include subsequent instructions for subsequently actuating the second pixels of the touch screen display associated with the second partial region at a second time to the exclusion of actuating the first pixels.

* * * * *